United States Patent
Boiero et al.

(10) Patent No.: US 11,536,863 B2
(45) Date of Patent: Dec. 27, 2022

(54) NOISE ATTENUATION OF MULTIPLE SOURCE SEISMIC DATA

(71) Applicant: WesternGeco LLC, Houston, TX (US)

(72) Inventors: Daniele Boiero, Gatwick (GB); Claudio Bagaini, Gatwick (GB); Amr Misbah, Cairo (EG); Phillip J. Bilsby, Gatwick (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 264 days.

(21) Appl. No.: 16/763,443

(22) PCT Filed: Nov. 19, 2018

(86) PCT No.: PCT/US2018/061748
§ 371 (c)(1),
(2) Date: May 12, 2020

(87) PCT Pub. No.: WO2019/099974
PCT Pub. Date: May 23, 2019

(65) Prior Publication Data
US 2020/0292724 A1    Sep. 17, 2020

Related U.S. Application Data

(60) Provisional application No. 62/588,420, filed on Nov. 19, 2017.

(51) Int. Cl.
   *G01V 1/30* (2006.01)
   *G01V 1/28* (2006.01)
   *G01V 1/38* (2006.01)

(52) U.S. Cl.
   CPC .......... *G01V 1/306* (2013.01); *G01V 1/282* (2013.01); *G01V 1/3808* (2013.01);
   (Continued)

(58) Field of Classification Search
   CPC ...... G01V 1/306; G01V 1/282; G01V 1/3808; G01V 2210/3246; G01V 2210/44;
   (Continued)

(56) References Cited

U.S. PATENT DOCUMENTS

| | | |
|---|---|---|
| 7,917,295 B2 | 3/2011 | Strobbia |
| 8,509,027 B2 | 8/2013 | Strobbia et al. |

(Continued)

FOREIGN PATENT DOCUMENTS

| | | | |
|---|---|---|---|
| WO | WO 2015134379 | * | 8/2015 |
| WO | WO 2016042374 | * | 3/2016 |
| WO | 2016100797 A1 | | 6/2016 |

OTHER PUBLICATIONS

Extended Search Report issued in European Patent Application No. 18879595.9 dated Jun. 29, 2021, 8 pages.

(Continued)

*Primary Examiner* — Catherine T. Rastovski

(57) ABSTRACT

A method includes acquiring seismic data of a region that utilizes multiple seismic energy sources and seismic energy receivers where the seismic data include blended seismic data for a number of emissions from a corresponding number of the multiple seismic energy sources; determining spatially distributed coherent noise properties for the region using the blended seismic data; via the spatially distributed coherent noise properties, modeling coherent noise as at least two coherent noise models for at least two of the emissions from a corresponding at least two of the multiple seismic energy sources; via the coherent noise models, attenuating coherent noise in a portion of the blended seismic data to generate coherent noise attenuated blended seismic data; deblending the coherent noise attenuated blended seismic data to generate deblended seismic data; and rendering an image of at least a portion of the region to a display using the deblended seismic data.

19 Claims, 20 Drawing Sheets

(52) U.S. Cl.
CPC .. *G01V 2210/3246* (2013.01); *G01V 2210/44* (2013.01); *G01V 2210/6222* (2013.01)

(58) Field of Classification Search
CPC ........... G01V 2210/6222; G01V 1/364; G01V 1/366; G01V 1/38; G01V 1/40; G01V 2210/1212; G01V 2210/127; G01V 2210/56; G01V 2210/6161; G01V 2210/74

See application file for complete search history.

(56) References Cited

U.S. PATENT DOCUMENTS

| | | | | |
|---|---|---|---|---|
| 2008/0294393 | A1* | 11/2008 | Laake | G01V 11/00 703/1 |
| 2010/0128563 | A1* | 5/2010 | Strobbia | G01V 1/30 367/49 |
| 2014/0365135 | A1* | 12/2014 | Poole | G01V 1/36 702/17 |
| 2015/0293249 | A1 | 10/2015 | Peng et al. | |
| 2015/0331124 | A1 | 11/2015 | Haacke et al. | |
| 2016/0003958 | A1 | 1/2016 | Baardman et al. | |
| 2016/0077231 | A1 | 3/2016 | Rohnke et al. | |
| 2016/0320507 | A1 | 11/2016 | Kashubin et al. | |
| 2016/0363681 | A1 | 12/2016 | Boiero | |
| 2018/0052249 | A1* | 2/2018 | Chen | G01V 1/282 |

OTHER PUBLICATIONS

Hays, D. et al., "Deblending seismic interference in ocean-bottom node data: A deepwater Gulf of Mexico subsalt example", SEG Technical Program Expanded Abstracts 2017, 2017, pp. 5033-5037.
International Preliminary Report on Patentability issued in the PCT Application PCT/US2018/061748, dated May 28, 2020 (7 pages).
Moore, I., Dragoset, B., Ommundsen, T., Wilson, T., Eke, D., Ward, C., Simultaneous source separation using dithered sources, SEG Technical Program Expanded Abstracts, 2008 SEG Annual Meeting, Nov. 9-14, Las Vegas, Nevada (5 pages).
Akerberg, P., Hampson, G., Rickett, J., Martin, H. and Cole, J., 2008, Simultaneous source separation by sparse Radon transform. SEG Technical Program Expanded Abstracts, SEG Annual Meeting, Nov. 9-14, Las Vegas, Nevada (5 pages).
Doulgeris, P., Mahdad, A. and Blacquière, G., 2010, Separation of blended impulsive sources using an iterative approach. 72nd EAGE Conference & Exhibition SPE EUROPEC 2010, Barcelona, Spain, Jun. 14-17, 2010 (5 pages).
Henin, G., Marin, D., Maitra, S., Rollet, A., Chandola, S.K., Kumar, S., El Kady, N. and Cheng Foo L., 2015, Deblending 4-component simultaneous-source data—A 2D OBC case study in Malaysia. SEG Technical Program Expanded Abstracts, 2015 SEG Annual Meeting, Oct. 18-23, New Orleans, Louisiana (5 pages).
Stefani, J., Hampson, G. and Herkenhoff, E., 2007, Acquisition using simultaneous sources. 69th EAGE Conference and Exhibition—London, UK, Jun. 11-14, 2007 (5 pages).
Shipilova, E., Barone, I., Boelle, G., Giboli, M., Piazza, J., Hugonnet, P. and Dupinet, C., 2016, Simultaneous-source seismic acquisitions: Do they allow reservoir characterization? A feasibility study with blended onshore real data. SEG Technical Program Expanded Abstracts, 2016 SEG International Exposition and Annual Meeting, Oct. 16-21, Dallas, Texas (6 pages).
Strobbia, C., Vermeer, P., Laake, A., Glushchenko, A. and Re, S., 2010, Surface waves: processing, inversion and removal. First Break, 28, 8, 85-91.
Strobbia, C., Zarkhidze, A., May, R., Quigley, J. and Bilsby, P., 2011, Attenuation of aliased coherent noise: model based attenuation for complex dispersive waves. First Break, 29, 8, 93-100.
International Search Report and Written Opinion issued in the PCT Application PCT/US2018/061748, dated Feb. 20, 2019 (9 pages).

* cited by examiner

Image 910

Image 930

1110

Blended Data Images 1418

Deblended Data Images 1419

Quality Issues in Coherent Noise in Images 1420

Blended Data Images 1622

Attenuation of Coherent Noise Images 1623

Deblended Data Images 1624

NOISE ATTENUATION OF MULTIPLE SOURCE SEISMIC DATA

RELATED APPLICATION

This application claims priority to and the benefit of a U.S. Provisional Application having Ser. No. 62/588,420, filed 19 Nov. 2017, which is incorporated by reference herein.

BACKGROUND

Reflection seismology finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz). Seismic data may be processed and interpreted, for example, to understand better composition, fluid content, extent and geometry of subsurface rocks. Various techniques described herein pertain to processing of data such as, for example, seismic data.

SUMMARY

A method includes acquiring seismic data of a region that utilizes multiple seismic energy sources and seismic energy receivers where the seismic data include blended seismic data for a number of emissions from a corresponding number of the multiple seismic energy sources; determining spatially distributed coherent noise properties for the region using the blended seismic data; via the spatially distributed coherent noise properties, modeling coherent noise as at least two coherent noise models for at least two of the emissions from a corresponding at least two of the multiple seismic energy sources; via the coherent noise models, attenuating coherent noise in at least a portion of the blended seismic data to generate coherent noise attenuated blended seismic data; deblending the coherent noise attenuated blended seismic data to generate deblended seismic data; and rendering an image of at least a portion of the region to a display using the deblended seismic data. A system can include a processor; memory operatively coupled to the processor; and processor-executable instructions stored in the memory to instruct the system to: acquire seismic data of a seismic survey of a region of the Earth that utilizes multiple seismic energy sources and seismic energy receivers where the seismic data include blended seismic data for a number of emissions from a corresponding number of the multiple seismic energy sources; determine spatially distributed coherent noise properties for the region using the blended seismic data; via the spatially distributed coherent noise properties, model coherent noise as at least two coherent noise models for at least two of the emissions from a corresponding at least two of the multiple seismic energy sources; via the coherent noise models, attenuate coherent noise in at least a portion of the blended seismic data to generate coherent noise attenuated blended seismic data; deblend the coherent noise attenuated blended seismic data to generate deblended seismic data; and render an image of at least a portion of the region of the Earth to a display using the deblended seismic data. One or more computer-readable storage media can include processor-executable instructions to instruct a computing system to: acquire seismic data of a seismic survey of a region of the Earth that utilizes multiple seismic energy sources and seismic energy receivers where the seismic data include blended seismic data for a number of emissions from a corresponding number of the multiple seismic energy sources; determine spatially distributed coherent noise properties for the region using the blended seismic data; via the spatially distributed coherent noise properties, model coherent noise as at least two coherent noise models for at least two of the emissions from a corresponding at least two of the multiple seismic energy sources; via the coherent noise models, attenuate coherent noise in at least a portion of the blended seismic data to generate coherent noise attenuated blended seismic data; deblend the coherent noise attenuated blended seismic data to generate deblended seismic data; and render an image of at least a portion of the region of the Earth to a display using the deblended seismic data. In such an example, the one or more computer-readable storage media can include processor-executable instructions to instruct a computing system to identify a structural feature in the image (e.g., via pattern/feature recognition, etc.). Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

As mentioned, reflection seismology finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz). Seismic data may be processed and interpreted, for example, to understand better composition, fluid content, extent and geometry of subsurface rocks.

Figure 1:
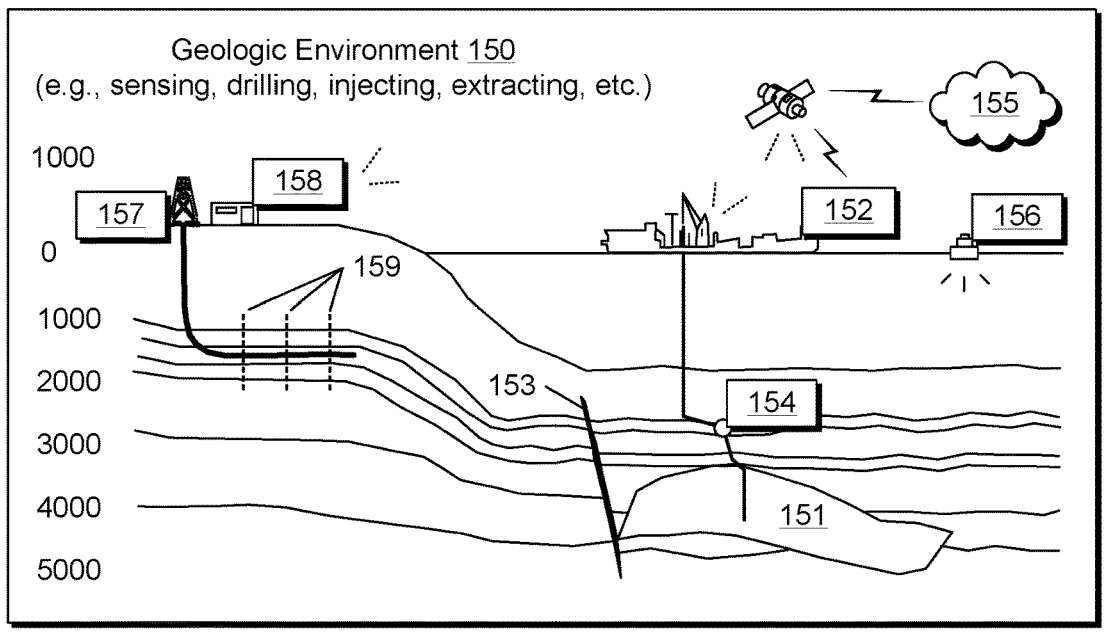
FIG. 1 illustrates an example of a geologic environment and an example of a technique.
Figure 1:
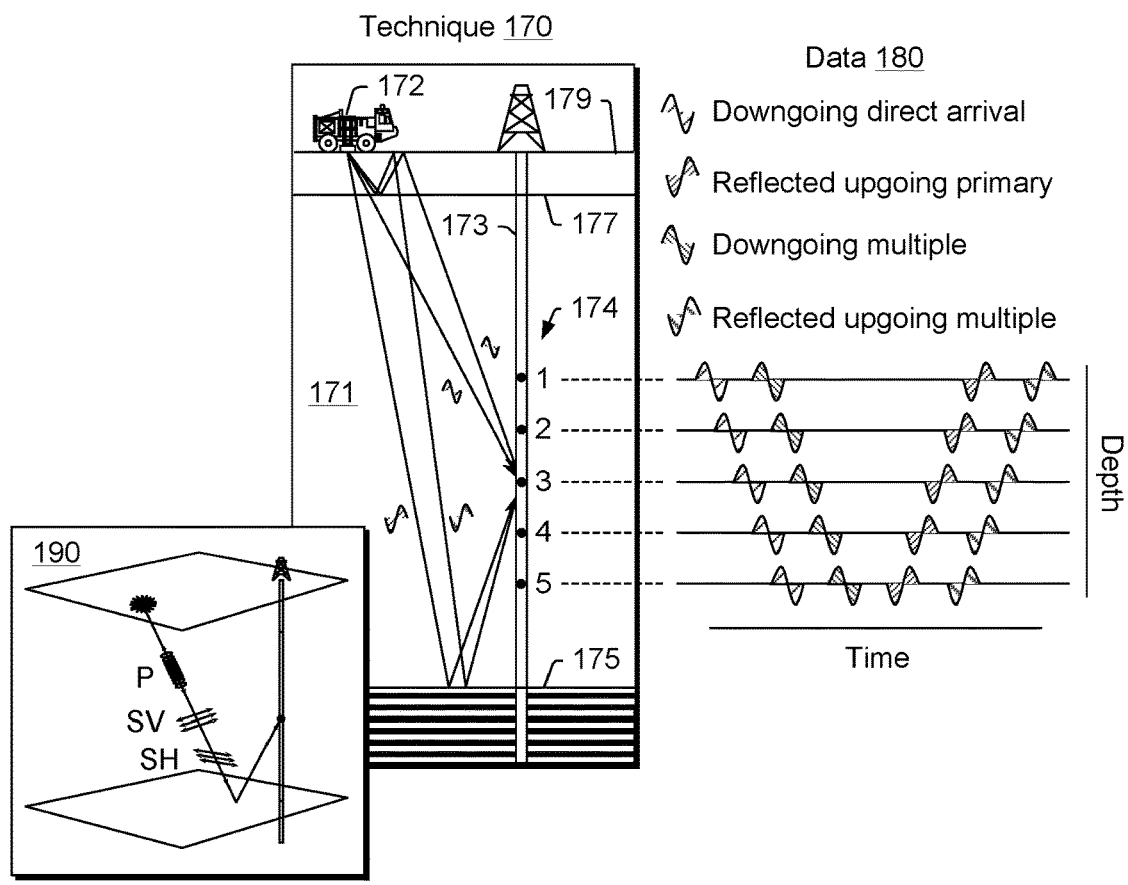

FIG. 1 shows an example of a geologic environment 150 (e.g., an environment that includes a sedimentary basin, a reservoir 151, one or more fractures 153, etc.) and an example of an acquisition technique 170 to acquire seismic data. As an example, a system may process data acquired by the technique 170, for example, to allow for direct or indirect management of sensing, drilling, injecting, extracting, etc., with respect to the geologic environment 150. In turn, further information about the geologic environment 150 may become available as feedback (e.g., optionally as input to the system).

As an example, a system may include features of an available simulation framework such as the PETREL® seismic to simulation software framework (Schlumberger Limited, Houston, Tex.). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of simulating a geologic environment).

As an example, a system may include add-ons or plug-ins that operate according to specifications of a framework environment. For example, a framework environment marketed as the OCEAN® framework environment (Schlumberger Limited, Houston, Tex.) allows for integration of add-ons (or plug-ins) into a PETREL® framework workflow. The OCEAN® framework environment leverages .NET® tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

In the example of FIG. 1, the geologic environment 150 may include layers (e.g., stratification) that include a reservoir 151 and that may be intersected by a fault 153. As an example, a geologic environment may be or include an offshore geologic environment, a seabed geologic environment, an ocean bed geologic environment, etc.

As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As an example, a system may be used to perform one or more workflows. A workflow may be a process that includes a number of worksteps. A workstep may operate on data, for example, to create new data, to update existing data, etc. As an example, a system may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

In FIG. 1, the technique 170 may be implemented with respect to a geologic environment 171. As shown, an energy source (e.g., a transmitter) 172 may emit energy where the energy travels as waves that interact with the geologic environment 171. As an example, the geologic environment 171 may include a bore 173 where one or more sensors (e.g., receivers) 174 may be positioned in the bore 173. As an example, energy emitted by the energy source 172 may interact with a layer (e.g., a structure, an interface, etc.) 175 in the geologic environment 171 such that a portion of the energy is reflected, which may then be sensed by one or more of the sensors 174. Such energy may be reflected as an upgoing primary wave (e.g., or "primary"). As an example, a portion of emitted energy may be reflected by more than one structure in the geologic environment and referred to as a multiple reflected wave (e.g., or "multiple"). For example, the geologic environment 171 is shown as including a layer 177 that resides below a surface layer 179. Given such an environment and arrangement of the source 172 and the one or more sensors 174, energy may be sensed as being associated with particular types of waves.

As shown in FIG. 1, acquired data 180 can include data associated with downgoing direct arrival waves, reflected upgoing primary waves, downgoing multiple reflected waves and reflected upgoing multiple reflected waves. The acquired data 180 is also shown along a time axis and a depth axis. As indicated, in a manner dependent at least in part on characteristics of media in the geologic environment 171, waves travel at velocities over distances such that relationships may exist between time and space. Thus, time information, as associated with sensed energy, may allow for understanding spatial relations of layers, interfaces, structures, etc. in a geologic environment.

FIG. 1 also shows various types of waves as including P, SV an SH waves. As an example, a P-wave may be an elastic body wave or sound wave in which particles oscillate in the direction the wave propagates. As an example, P-waves incident on an interface (e.g., at other than normal incidence, etc.) may produce reflected and transmitted S-waves (e.g., "converted" waves). As an example, an S-wave or shear wave may be an elastic body wave, for example, in which particles oscillate perpendicular to the direction in which the wave propagates. S-waves may be generated by a seismic energy sources (e.g., other than an air gun). As an example, S-waves may be converted to P-waves. S-waves tend to travel more slowly than P-waves and do not travel through fluids that do not support shear. In general, recording of S-waves involves use of one or more receivers operatively coupled to earth (e.g., capable of receiving shear forces with respect to time). As an example, interpretation of S-waves may allow for determination of rock properties such as fracture density and orientation, Poisson's ratio and rock type, for example, by crossplotting P-wave and S-wave velocities, and/or by other techniques.

As an example of parameters that can characterize anisotropy of media (e.g., seismic anisotropy), consider the Thomsen parameters $\varepsilon$, $\delta$ and $\gamma$. The Thomsen parameter $\delta$ can describe offset effects (e.g., short offset). As to the Thomsen parameter $\varepsilon$, it can describe offset effects (e.g., a long offset) and can relate to a difference between vertical and horizontal compressional waves (e.g., P or P-wave or quasi compressional wave qP or qP-wave). As to the Thomsen parameter $\gamma$, it can describe a shear wave effect. For example, consider an effect as to a horizontal shear wave with horizontal polarization to a vertical shear wave.

As an example, seismic data may be acquired for a region in the form of traces. In the example of FIG. 1, the technique 170 may include the source 172 for emitting energy where portions of such energy (e.g., directly and/or reflected) may be received via the one or more sensors 174. As an example, energy received may be discretized by an analog-to-digital converter that operates at a sampling rate. For example, acquisition equipment may convert energy signals sensed by a sensor to digital samples at a rate of one sample per approximately 4 ms. Given a speed of sound in a medium or media, a sample rate may be converted to an approximate distance. For example, the speed of sound in rock may be of the order of around 5 km per second. Thus, a sample time spacing of approximately 4 ms would correspond to a sample "depth" spacing of about 10 meters (e.g., assuming a path length from source to boundary and boundary to sensor). As an example, a trace may be about 4 seconds in duration; thus, for a sampling rate of one sample at about 4 ms intervals, such a trace would include about 1000 samples where latter acquired samples correspond to deeper reflection boundaries. If the 4 second trace duration of the foregoing example is divided by two (e.g., to account for reflection), for a vertically aligned source and sensor, the deepest boundary depth may be estimated to be about 10 km (e.g., assuming a speed of sound of about 5 km per second).

Figure 2:
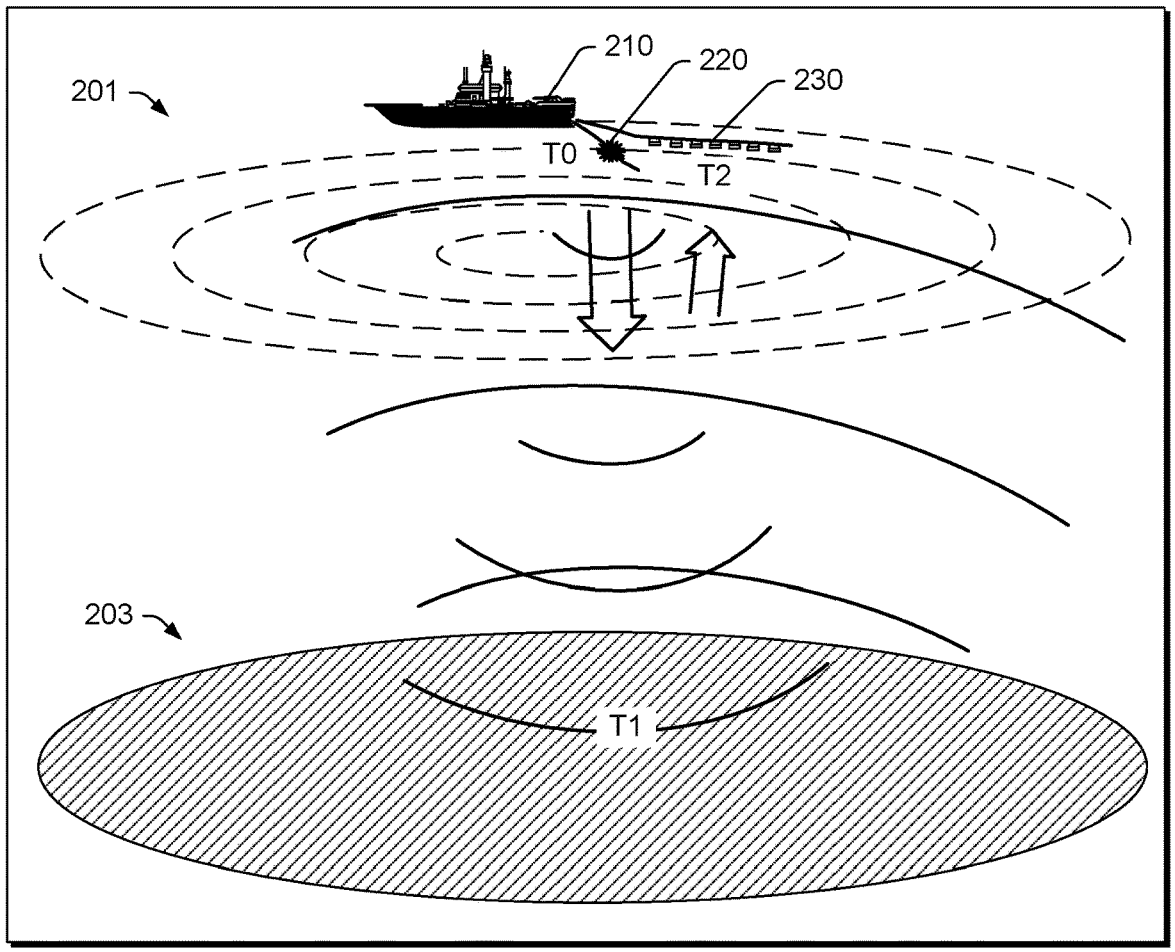
FIG. 2 illustrates an example of a geologic environment and examples of equipment.
Figure 2:
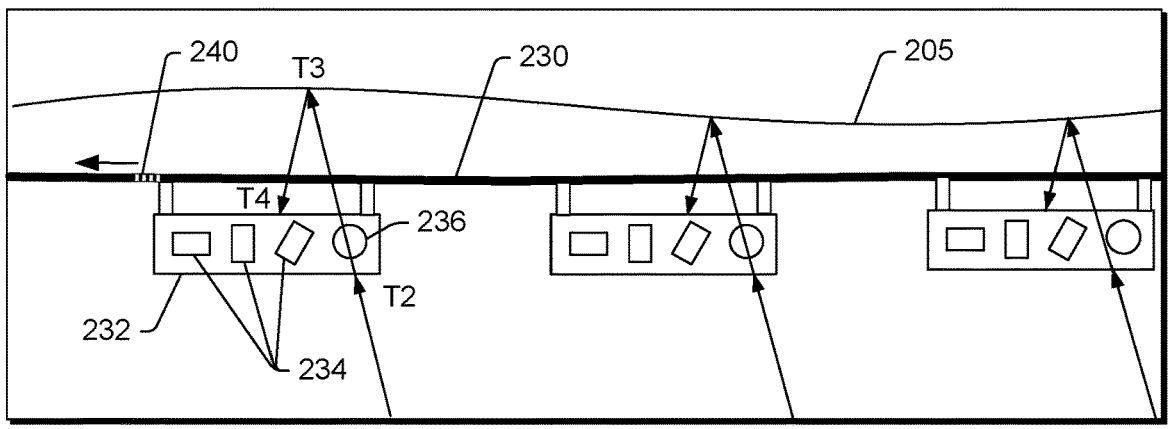
Figure 2:
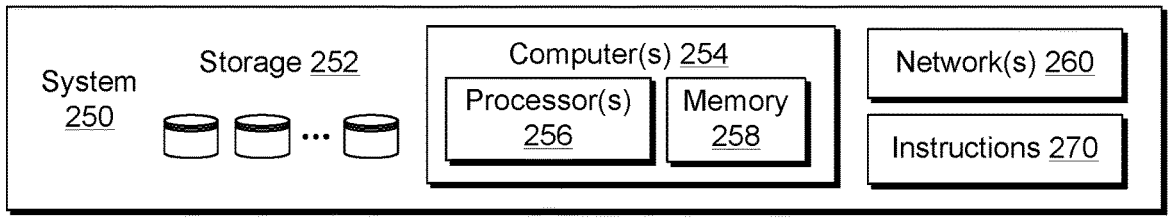

FIG. 2 shows an example of a geologic environment 201 that includes a seabed 203 and a sea surface 205. As shown, equipment 210 such as a ship may tow an energy source 220 and a string of sensors 230 at a depth below the sea surface 205. In such an example, the energy source 220 may emit energy at a time T0, a portion of that energy may be reflected from the seabed 203 at a time T1 and a portion of that reflected energy may be received at the string of sensors 230 at a time T2.

As mentioned with respect to the technique 170 of FIG. 1, a wave may be a primary or a multiple. As shown in an enlarged view of the geologic environment 201, the sea surface 205 may act to reflect waves such that sensors 232 of the string of sensors 230 may sense multiples as well as primaries. In particular, the sensors 232 may sense so-called sea surface multiples, which may be multiples from primaries or multiples of multiples (e.g., due to sub-seabed reflections, etc.).

As an example, each of the sensors 232 may sense energy of an upgoing wave at a time T2 where the upgoing wave reflects off the sea surface 205 at a time T3 and where the sensors may sense energy of a downgoing multiple reflected wave at a time T4 (see also the data 180 of FIG. 1 and data 240 of FIG. 2). In such an example, sensing of the downgoing multiple reflected wave may be considered noise that interferes with sensing of one or more upgoing waves. As an example, an approach that includes summing data acquired by a geophone and data acquired by a hydrophone may help to diminish noise associated with downgoing multiple reflected waves. Such an approach may be employed, for example, where sensors may be located proximate to a surface such as the sea surface 205 (e.g., arrival times T2 and T4 may be relatively close). As an example, the sea surface 205 or a water surface may be an interface between two media. For example, consider an air and water interface. As an example, due to differing media properties, sound waves may travel at about 1,500 m/s in water and at about 340 m/s in air. As an example, at an air and water interface, energy may be transmitted and reflected.

As an example, each of the sensors 232 may include at least one geophone 234 and a hydrophone 236. As an example, a geophone may be a sensor configured for seismic acquisition, whether onshore and/or offshore, that can detect velocity produced by seismic waves and that can, for example, transform motion into electrical impulses. As an example, a geophone may be configured to detect motion in a single direction. As an example, a geophone may be configured to detect motion in a vertical direction. As an example, three mutually orthogonal geophones may be used in combination to collect so-called 3C seismic data. As an example, a hydrophone may be a sensor configured for use in detecting seismic energy in the form of pressure changes under water during marine seismic acquisition. As an example, hydrophones may be positioned along a string or strings to form a streamer or streamers that may be towed by a seismic vessel (e.g., or deployed in a bore). Thus, in the example of FIG. 2, the at least one geophone 234 can provide for motion detection and the hydrophone 236 can provide for pressure detection. As an example, the data 240 (e.g., analog and/or digital) may be transmitted via equipment, for example, for processing, etc.

As an example, a method may include analysis of hydrophone response and vertical geophone response, which may help to improve a PZ summation, for example, by reducing receiver ghost and/or free surface-multiple noise contamination. As an example, a ghost may be defined as a reflection of a wavefield as reflected from a water surface (e.g., water and air interface) that is located above a receiver, a source, etc. (e.g., a receiver ghost, a source ghost, etc.). As an example, a receiver may experience a delay between an upgoing wavefield and its downgoing ghost, which may depend on depth of the receiver.

As an example, a surface marine cable may be or include a buoyant assembly of electrical wires that connect sensors and that can relay seismic data to the recording seismic vessel. As an example, a multi-streamer vessel may tow more than one streamer cable to increase the amount of data acquired in one pass. As an example, a marine seismic vessel may be about 75 m long and travel about 5 knots, for example, while towing arrays of air guns and streamers containing sensors, which may be located, for example, about a few meters below the surface of the water. A so-called tail buoy may assist crew in location an end of a streamer. As an example, an air gun may be activated periodically, such as about intervals of 25 m (e.g., about intervals of 10 seconds) where the resulting sound wave travels into the Earth, which may be reflected back by one or more rock layers to sensors on a streamer, which may then be relayed as signals (e.g., data, information, etc.) to equipment on the tow vessel.

In the example of FIG. 2, the equipment 210 may include a system such as the system 250. As shown in FIG. 2, the system 250 includes one or more information storage devices 252, one or more computers 254, one or more network interfaces 260 and one or more sets of instructions 270. As to the one or more computers 254, each computer may include one or more processors (e.g., or processing cores) 256 and memory 258 for storing instructions (e.g., consider one or more of the one or more sets of instructions 270), for example, executable by at least one of the one or more processors. As an example, a computer may include one or more network interfaces (e.g., wired or wireless), one or more graphics cards, a display interface (e.g., wired or wireless), etc.

As an example, pressure data may be represented as "P" and velocity data may be represented as "Z". As an example, a hydrophone may sense pressure information and a geophone may sense velocity information. As an example, hydrophone may output signals, optionally as digital data, for example, for receipt by a system. As an example, a geophone may output signals, optionally as digital data, for example, for receipt by a system. As an example, the system 250 may receive P and Z data via one or more of the one or more network interfaces 260 and process such data, for example, via execution of instructions stored in the memory 258 by the processor 256. As an example, the system 250 may store raw and/or processed data in one or more of the one or more information storage devices 252.

Figure 3:
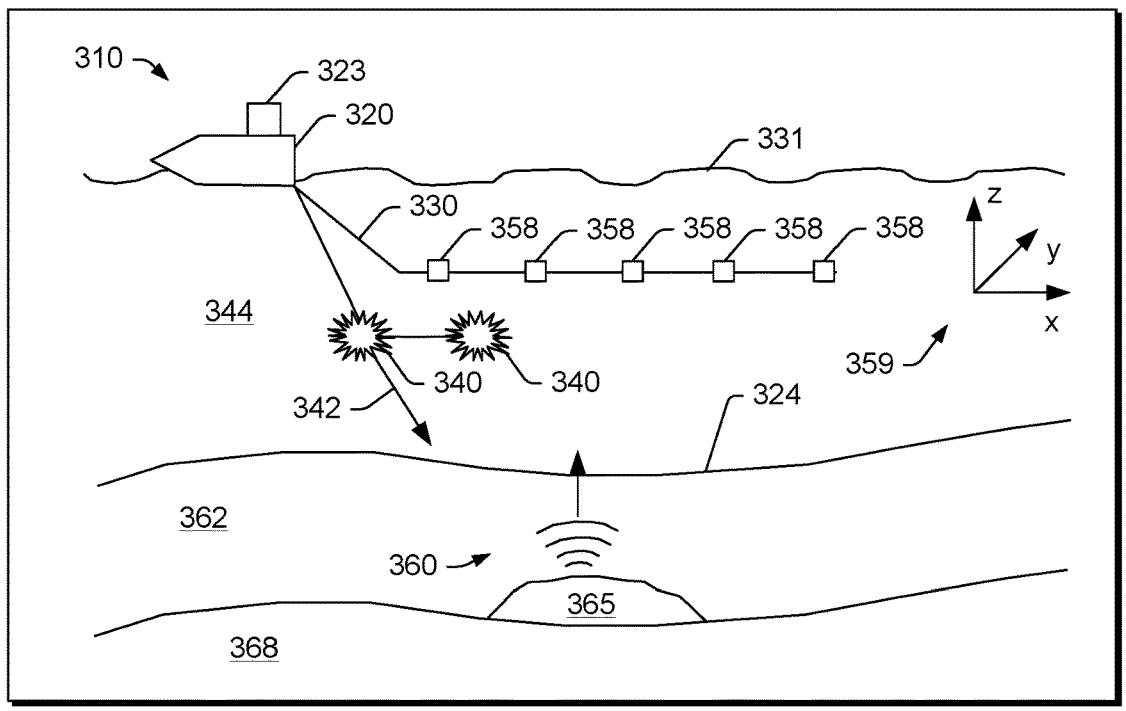
FIG. 3 illustrates an example of a geologic environment, examples of equipment and an example of a method.
Figure 3:
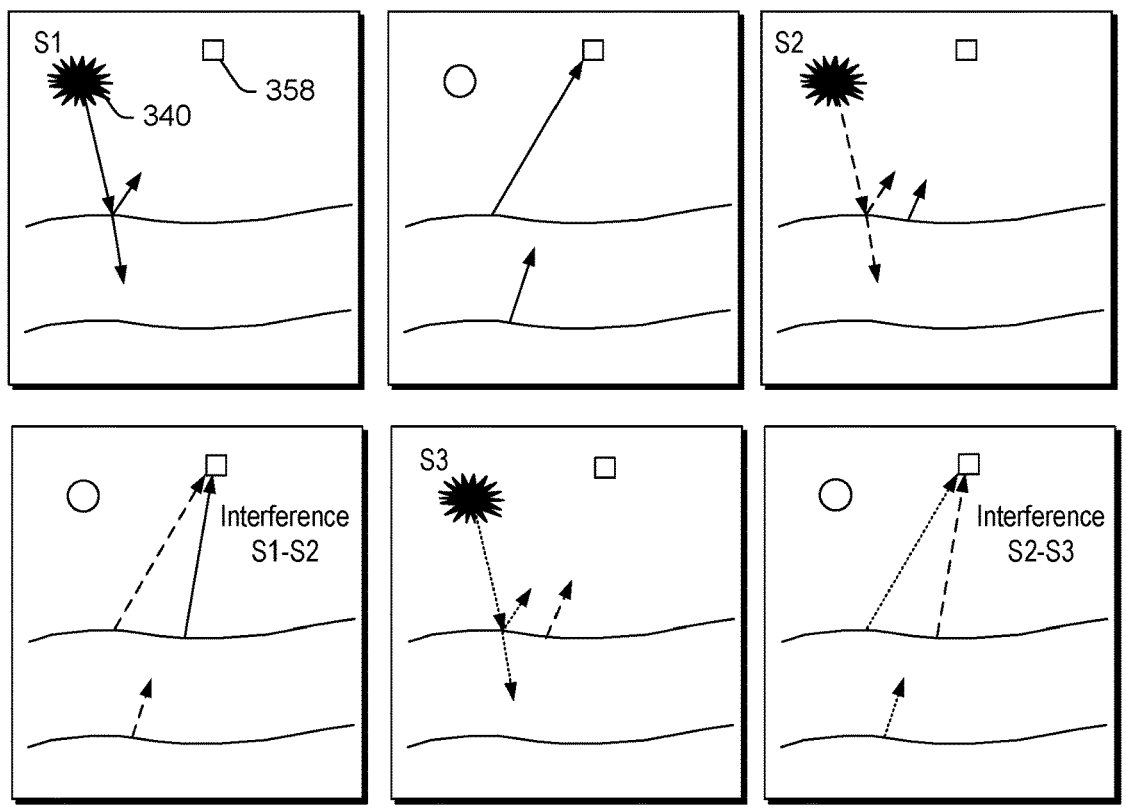

FIG. 3 illustrates a schematic diagram of an example of a marine-based seismic acquisition system 310 and an example of a method 390. In the system 310, a survey vessel 320 may tow one or more seismic streamers 330 behind the vessel 320. As an example, streamers 330 may be arranged in a spread in which multiple streamers 330 are towed in approximately a plane at a depth. As an example, streamers may be towed at multiple depths (e.g., consider an over/under configuration).

As an example, the seismic streamers 330 may be several thousand meters long and may include various support cables, as well as wiring and/or circuitry that may be used to facilitate communication along the streamers 330. As an example, an individual streamer 330 may include a primary cable where the seismic sensors 358 that can record seismic signals may be mounted. As an example, the seismic sensors 358 may include hydrophones that acquire pressure data. As another example, the seismic sensors 358 may include one or more multi-component sensors, for example, consider a sensor capable of detecting a pressure wavefield and at least one component of a particle motion that is associated with acoustic signals that are proximate to the sensor. Examples of particle motions include one or more components of a particle displacement, one or more components (e.g., inline (x), crossline (y) and vertical (z) components (see, e.g., coordinate axes 359) of a particle velocity and one or more components of a particle acceleration.

As an example, the marine-based seismic data acquisition system 310 may include one or more seismic sources 340 (e.g., air guns, etc.). As shown in the example of FIG. 3, the seismic sources 340 may be coupled to, or towed by, the survey vessel 320. As another example, the seismic sources 340 may operate independently of the survey vessel 320 in that the sources 340 may be coupled to another vessel or vessels, to a buoy or buoys, etc.

As an example, the seismic streamers 330 can be towed behind the survey vessel 320 where acoustic signals 342 (e.g., "shots") may be produced by the seismic sources 340. The acoustic signals 342 may be directed down through a water column 344 into strata 362 and 368 beneath a water bottom surface 324. As an example, at least a portion of the acoustic signals 342 may be reflected from subterranean geological formation(s), for example, consider a formation 365 as depicted in FIG. 3.

As an example, incident acoustic signals 342 generated by the sources 340 can produce corresponding reflected acoustic signals, or pressure waves 360, which may be sensed by one or more of the seismic sensors 358. As an example, pressure waves received and sensed by one or more of the seismic sensors 358 may include "up going" pressure waves that propagate to the one or more sensors 358 without reflection and, for example, "down going" pressure waves that are produced in part by reflections of the pressure waves 360 from an air-water boundary 331.

As an example, the seismic sensors 358 may generate signals, which may be traces or structured as traces (e.g., amplitude with respect to time, etc.). For example, consider traces that include information as to measurements of pressure wavefield and particle motion. As an example, signals may be recorded and may be processed by a signal processing unit 323, which may optionally be deployed on the survey vessel 320.

As an example, a method can include performing a seismic survey that acquires seismic data (e.g., traces, etc.) where such data can build an "image" of a survey area, for example, for purposes of identifying one or more subterranean geological formations (see, e.g., the formation 365). As an example, subsequent analysis of seismic data (e.g., interpretation, etc.) may reveal one or more possible locations of hydrocarbon deposits in one or more subterranean geological formations. As an example, an analysis can include determining one or more characteristics of one or more types of hydrocarbons. As an example, an analysis can include one or more of image generation and attribute generation (e.g., seismic attribute generation, etc.).

As an example, a particular one of the one or more seismic sources 340 may be part of an array of seismic source elements (e.g., air guns, etc.) that may be arranged in strings (e.g., gun strings, etc.) of the array. As an example, one or more sources may be fired (e.g., actuated to emit energy) according to a time schedule (e.g., a timing sequence) during a survey. As an example, a land-based seismic acquisition system may acquire data that may be processed, for example, via one or more of the methods described herein.

As mentioned, sources may be fired (e.g., actuated) according to a time schedule, a timing sequence, etc. As an example, consider a sequential source firing method that includes firing sources at intervals combined with continuous vessel travel. As another example, consider a simultaneous source firing method that include firing more than one shot at a given point in time (e.g., within a small duration of time such that analysis may consider the shots to be simultaneous). In such an example, sensors may sense information from multiple simultaneous shots and, for example, processing of the sensed information may separate the sensed information into individual source components. As an example, where simultaneous source firing is implemented, "boat time" (e.g., turnaround time, etc.) may be approximately the same or less than a sequential technique (e.g., depending on survey parameters, goals, etc.).

In FIG. 3, the method 390 includes firing a source 340 at a source firing time S1, firing the source 340 at a source firing time S2 and firing the source 340 at a source firing time S3. The method 390 also includes receiving signals at the seismic sensor 358. Such a method may result in strong deep interference. For example, where after one shot is fired from a source, a subsequent shot is fired from the source and energy associated with the subsequent shot is received at a seismic sensor over a period of time during which energy from the prior shot is also received. In such an example, a portion of energy of the prior shot interferes with acquisition of energy from the latter shot. The portion of energy from the prior shot may be referred to as late arriving energy (e.g., late data). As an example, interference may also occur in a survey where sources are fired in a relatively simultaneous manner. In such an example, some amount of interference may be expected and, for example, a purposeful part of a survey.

As to the energy associated with the source 340 at the source firing time S1, it can be partially reflected at an interface to generate a reflected upgoing portion while another portion penetrate deeper toward another interface. Thus, in the simplified illustration, two portions exist, an upgoing portion and a downgoing portion. As illustrated, at approximately a source firing time S2, an upgoing portion from the source firing time S1 and an upgoing portion from the source firing time S2 can exist. As these portions travel upwards, they can arrive at the seismic sensor 358 over a common span of time to result in S1-S2 interference. As illustrated, for the source firing time S3, there may be S2-S3 interference. Accordingly, interference can exist in data for a plurality of shots of a survey.

As an example, interference can exist in one or more types of surveys such as, for example, a land-based survey or a sea-based survey. As mentioned, interference can be more pronounced where a survey aims to acquire data for deep structures in a geologic environment.

As explained, seismic reflection surveying, which may be referred to as reflection seismology, is a technology that can be used to image subsurface regions of the Earth, for example, via a survey acquisition geometry of sources and receivers that acquires seismic data. As an example, triangulation can be used to place reflections indicated in seismic data in estimated locations with appropriate amplitudes, which can then be interpreted (e.g., to identify a structure, fluid, etc.). Amplitudes in seismic data can be indicative of relative changes in physical properties of material in the Earth (e.g., impedance, etc.). As an example, for a 3D seismic survey, seismic tomographic data can be volumetric, which may be referred to as a seismic volume, which can be processed, for example, to yield impedances between the reflecting boundaries that exist within the Earth due to physical properties of the material in the Earth.

In certain types of seismic surveys (e.g., seismic tomographic surveys), so-called cross-talk noise can exist. An approach to cross-talk noise can involve actions near the start of a processing sequence, which can be referred to as active deblending. Such an approach generally relies on introduction of random but known small variations in source firing times from shot to shot. The use of such firing times aims to ensure that cross-talk noise has an impulsive character in domains other than the common shot.

In techniques that aim to attenuate cross-talk noise, data can be deblended, for example, by attenuating the cross-talk noise using an impulsive denoising technique, for example, involving the approach explained above (e.g., use of "impulsive character"). Some other techniques for deblending focus on iterative incremental removal of cross-talk noise or on simultaneously deriving model representations for multiple sources based on source firing time information. Such techniques fail to alleviate interference, which can be seen in images of data processed by such techniques. Some techniques aim to exploit signal coherency (and crosstalk noise incoherency) to justify sparse models; however, such techniques tend to be less reliable in the presence of high-amplitude coherent noise like surface- and guided-waves in land and shallow water environments.

As an example, a method can include attenuating coherent noise in a manner that allows for an improvement to quality and/or a reduction in acquisition time, for example, the amount of time to perform a seismic survey that utilizes multiple sources (e.g., a simultaneous multi-source survey). Such a method can include attenuating coherent noise prior to source separation. As an example, a method can include active deblending that provides for attenuating coherent noise prior to source separation.

As an example, a method can include estimating coherent noise properties over a surveyed region from blended data and using mode properties and the blended data to model coherent noise from a single shot.

As an example, a method can include estimating coherent noise properties over a surveyed region from blended data; characterizing a near-surface in terms of visco-elastic properties (e.g., which may be selectable to utilize as an option); calculating a high resolution spatial distribution of mode properties, in particular velocity and attenuation, from the near-surface model (e.g., as appropriate, which may be optional); using the mode properties and the blended data to model coherent noise from a single shot; blending coherent noise from a plurality of single shots to model cross-talk noise using source time delay information; simultaneously (e.g., adaptively) subtracting single shot and a blended coherent noise model; applying source- and receiver-side static adjustments calculated from near surface model (e.g., as appropriate, which may be optional); and separating sources using one or more techniques. As mentioned, such an approach can improve one or more processes because coherent noise is attenuated prior to source separation.

As an example, a method can include estimating coherent noise properties over a surveyed region from blended data and using these properties and the blended data to model coherent noise from a single shot. In such an example, the estimation of coherent noise properties for a surveyed region can be in terms of one or more frequencies (e.g., Hz) where coherent noise may be given in terms of velocity (e.g., m/s).

For example, consider a multidimensional plot of properties given for a survey region spanning a two-dimensional space (e.g., footprint) where properties can be given along a frequency dimension where values are coded in terms of velocity (e.g., color or other coding, etc.). Such an approach can allow for visualization of coherent noise properties, which may be stored, for example, in a data structure such as an array or arrays, etc. (e.g., within a data storage device or devices).

As an example, a method can operate on blended data, which can be data acquired via a blended acquisition scheme that utilizes multiple sources with source shots that can be defined as "simultaneous" (e.g., with shot wavefields that overlap in time). Such a method can estimate coherent noise properties from such blended data. Given such properties, and the blended data, the method can model coherent noise from a single shot.

Blended data acquisition aims to increase acquisition efficiency, for example, by activating a source while still recording the Earth's reflections from another, previously activated source. Such an approach can provide a time and/or cost saving or, for example, allow for a denser survey to be acquired in a given amount of time. However, signal overlap at receivers tends to result in cross-talk noise contamination, which can degrade quality with respect to imaging, interpretation, etc.

As an example, a method can be utilized for improving seismic imaging, for example, a method can include acquiring seismic data of a seismic survey of a region of the Earth that utilizes multiple seismic energy sources and seismic energy receivers where the seismic data include blended seismic data for a number of emissions from a corresponding number of the multiple seismic energy sources; determining coherent noise properties for the region using the blended seismic data; via the coherent noise properties, modeling coherent noise as a coherent noise model for one of the emissions from a corresponding one of the multiple seismic energy sources; via the coherent noise model, attenuating coherent noise in at least a portion of the blended seismic data to generate coherent noise attenuated blended seismic data; deblending the coherent noise attenuated blended seismic data to generate deblended seismic data; and rendering an image of at least a portion of the region to a display using the deblended seismic data. In such an example, the modeling can be repeated for various individual emissions as corresponding to various individual seismic energy sources. Such a method can improve seismic imaging, which can improve seismic interpretation where various features in a seismic image can be assessed to identify one or more structural features in a region of the Earth. As mentioned, a method can improve seismic imaging by attenuating coherent noise prior to deblending. In such an example, upon deblending and image generation, a higher quality image can be achieved.

Figure 4:
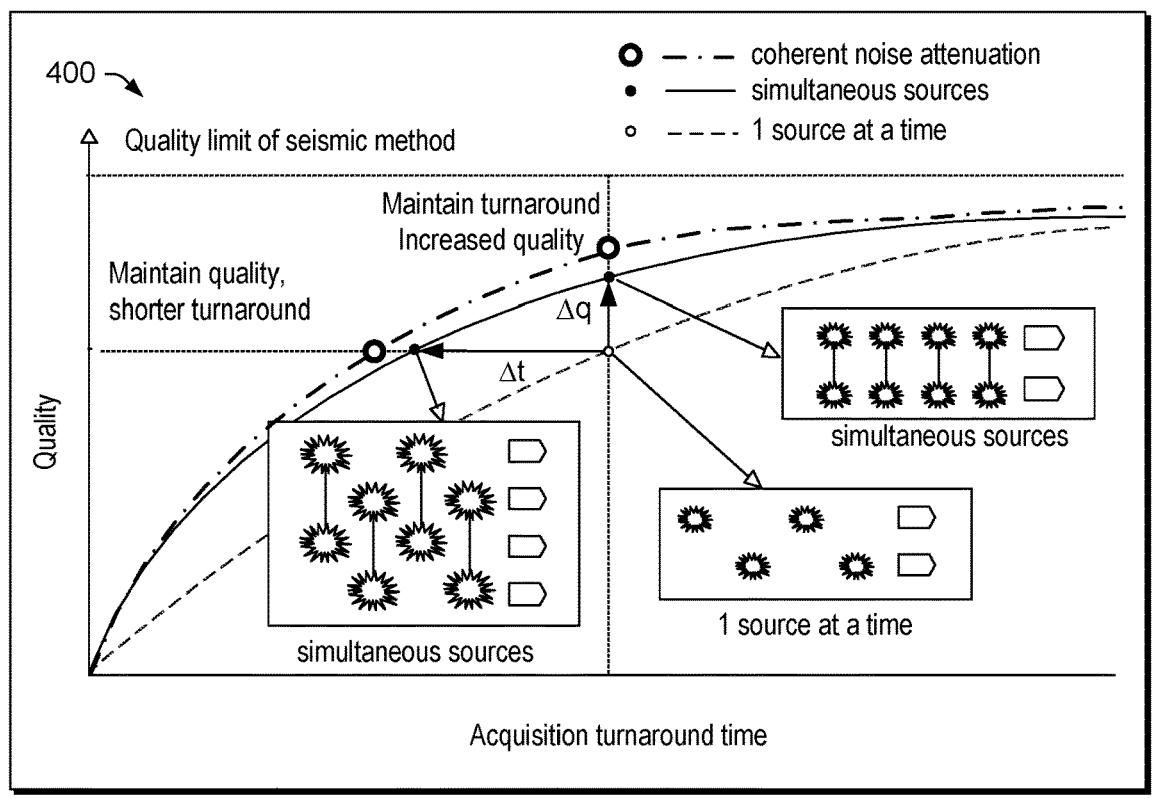
FIG. 4 illustrates an example of a geologic environment and examples of equipment.
Figure 4:
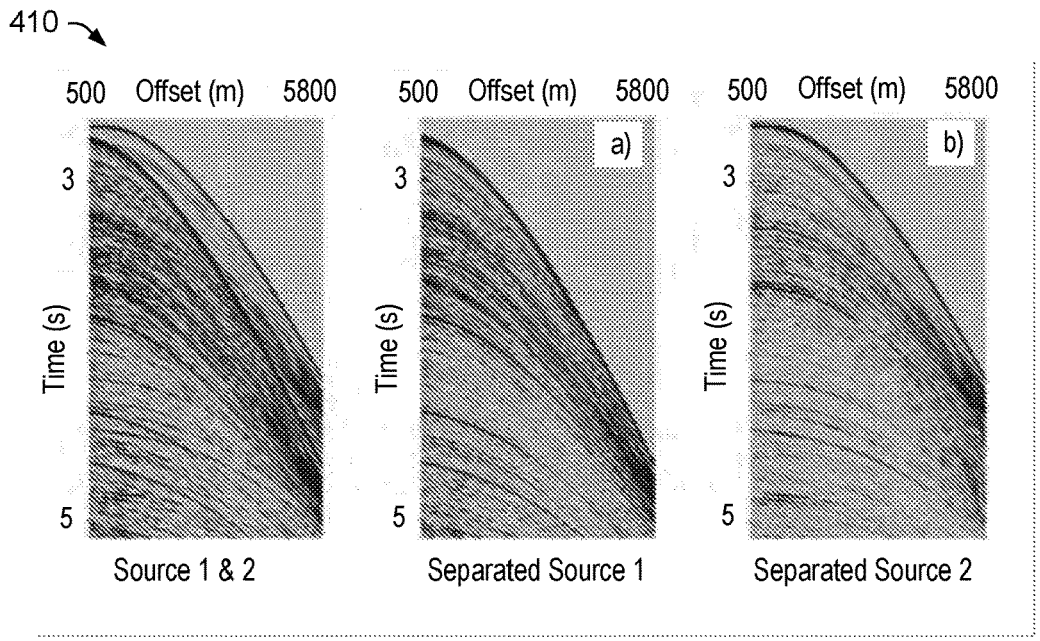

FIG. 4 shows an example plot 400 of quality versus acquisition turnaround time. For example, consider a simultaneous seismic source acquisition and processing technique that may allow for an improvement in quality for a standard turnaround time or a reduced turnaround time that may aim to achieve a quality level of a sequential technique (e.g., which would take a longer time). In FIG. 4, a dashed curve corresponds to a single source firing at a time approach while a solid curve corresponds to a simultaneous source firing at a time approach. As illustrated, time may be shortened (see, e.g., Δt) and/or quality may be improved (see, e.g., Δq). As mentioned, interference may occur in one or more types of surveys.

FIG. 4 further shows in the plot 400 another curve, which is an estimated curve that illustrates how improvements in attenuation of coherent noise can have a beneficial impact on acquisition turnaround time and/or quality. For example, a method can include attenuating coherent noise using a coherent noise model prior to deblending such that one or more improvement can be achieved, for example, in the context of the simultaneous sources survey techniques.

FIG. 4 also shows a series of images 410 for shots where a shot is an emission from a source. In the example, a pair of guns in a four-boat configuration fired sources (shots or emissions) in an acquisition time window. The left image demonstrates the presence of two water-bottom reflections where an upper reflection is associated with source 2. The center and right images (a and b) show the shot record on the left after source separation where the center image corresponds to source 1 and the right image corresponds to source 2. Such a process is referred to as "source separation".

A method for source separation can include acquiring seismic data of a survey that utilizes multiple sources where the seismic data include blended seismic data for a number of emissions from a corresponding number of the multiple sources and associating at least two portions of the blended seismic data correspondingly with at least two of the multiple sources. For example, in FIG. 4, the blended seismic data are the data shown in the left image for sources 1 and 2, while the portions shown in the center and right are associated with source 1 and source 2, correspondingly. In such a process (e.g., source separation), noise can present some issues that may confound associating portions of blended seismic data correspondingly with sources.

Figure 5:
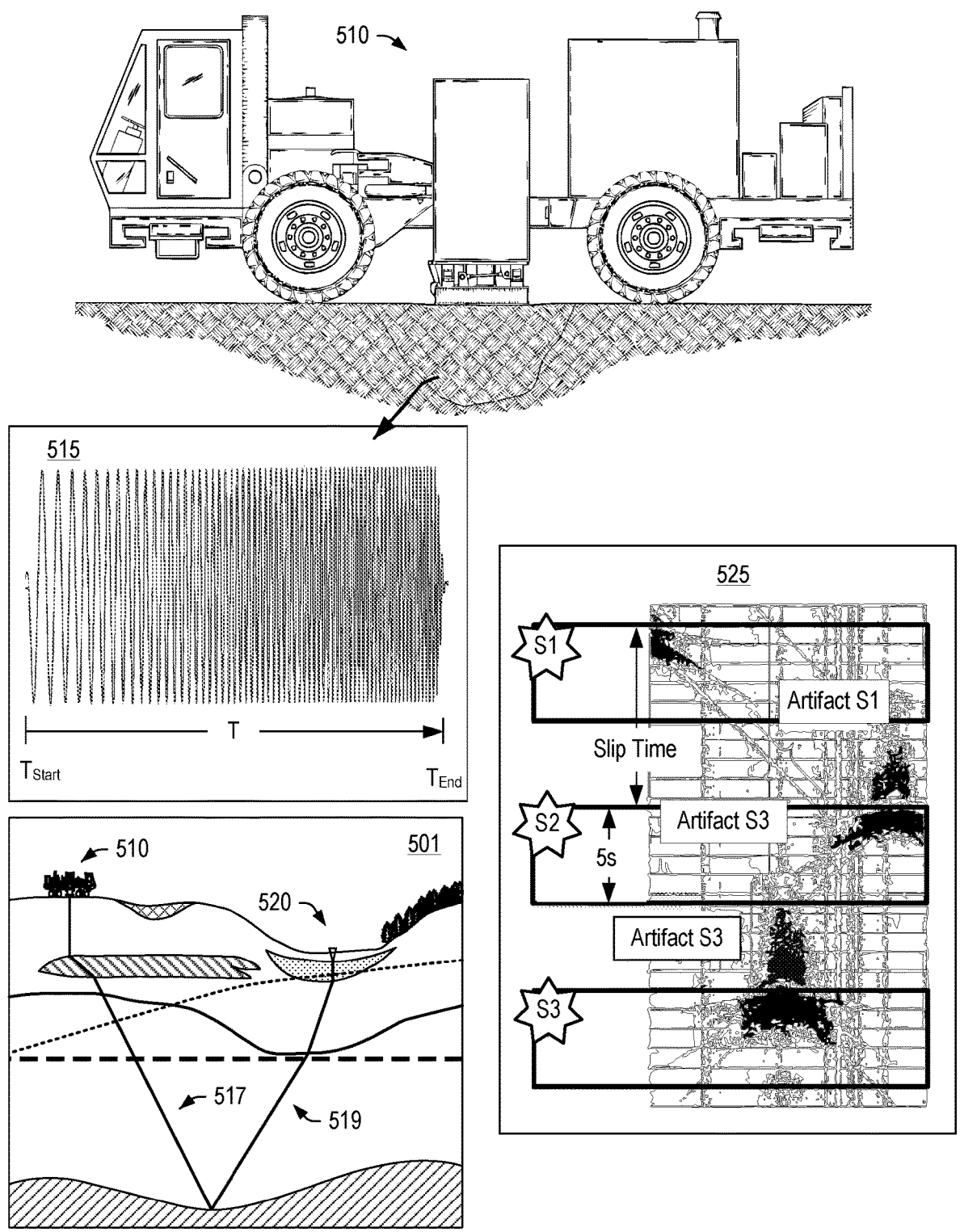
FIG. 5 illustrates an example of a geologic environment, an example of a method, examples of equipment and examples of data.

FIG. 5 shows a geologic environment 501 (lower left), equipment 510, a plot 515 of a frequency sweep as generated by the equipment 510 (e.g., with start and end times), downgoing energy 517 of the frequency sweep, upgoing energy 519 of the frequency sweep, and a sensor 520 (a node as in an array or grid). While FIG. 5 is shown as a land-based survey, various features, actions, etc., may be applied in a marine survey where seabed sensors are employed (see the marine-based survey 380 of FIG. 3).

FIG. 5 also shows a plot of data 525, as may be acquired using various field equipment. In FIG. 5, the data 525 are a simultaneous vibroseis survey that included seismic energy emissions S1, S2 and S3. Specifically, the data are plotted as a correlated record from a simultaneous vibroseis acquisition where artifacts of an air blast from S1 (cross airwave), chimney noise from S3 and harmonic from S3 (cross harmonic) are labeled along with a slip time and a record length for S2 (about 5 seconds). In a vibroseis survey, various types of noise may be present such as chimney noise, which may be seen when data are correlated with a survey sweep and visualized (as a column). As to other types of noise, these may include ground-roll and/or air-blast types of noise. In a slip-sweep operations data can be recorded as a mother record where the interval between two consecutive sweeps is referred to as the slip time (see S1 and S2 and slip time).

A frequency sweep of seismic energy as emitted by a seismic energy source (vibrator, etc.) can travel into a geologic environment and can be reflected at least in part by material in the geologic environment (consider a reflector as an interface between layers of contrasting acoustic properties). In a record of sensed seismic energy, as acquired by one or more sensor units, the reflector can be an event that exists as a feature in the record (traces, etc.) as associated with various frequencies of the frequency sweep, which is spread across a duration in time. In such an approach, the record can include information associated with the reflector as "imaged" by a plurality of frequencies of the frequency sweep. As the frequency sweep occurs over a duration in time, the event can appear in the record at a plurality of times.

As shown in the plot 515 of FIG. 5, the frequency sweep includes a start time ($T_{start}$) and an end time ($T_{End}$) where a duration between these two times is labeled T ($T=T_{End}-T_{start}$). A record length associated with emitted energy and seismic data is shown in the plot 525 of FIG. 5 (see S2 and the record length of about 5 seconds).

As to noise, ground roll is a type of coherent noise generated by a surface wave such as, for example, a low-velocity, low-frequency, high-amplitude Rayleigh wave. Ground roll can obscure signal and degrade overall data quality.

Figure 6:
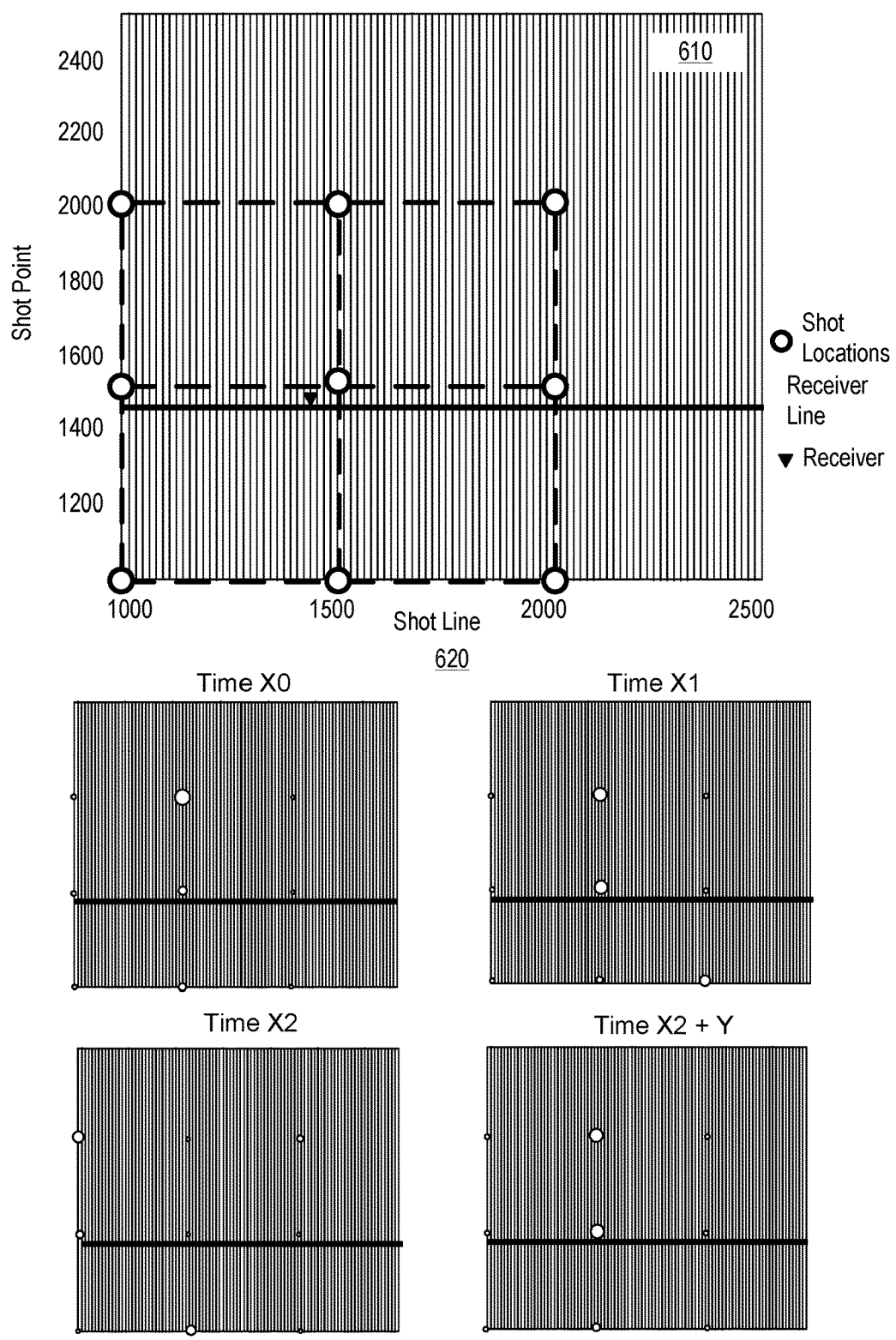
FIG. 6 illustrates an example of a survey and sources and an example of timing sequences.

FIG. 6 shows various examples of a survey geometry with source locations 610 and timing sequence for sources 620. In the graphics of FIG. 6, a line is plotted that represents a line of receivers where an inverted triangle identifies one of the receivers of the line. As to the timing sequence for sources 620, times X0, X1, X2 and X2+Y are shown. Open circles show the positions of the sources, which may be firing at random times in different positions. The receivers (e.g., sensors) can acquire multiple source data where, for example, data associated with one source overlaps in time data from at least one other source such that the data may be referred to as simultaneous source data.

Figure 7:
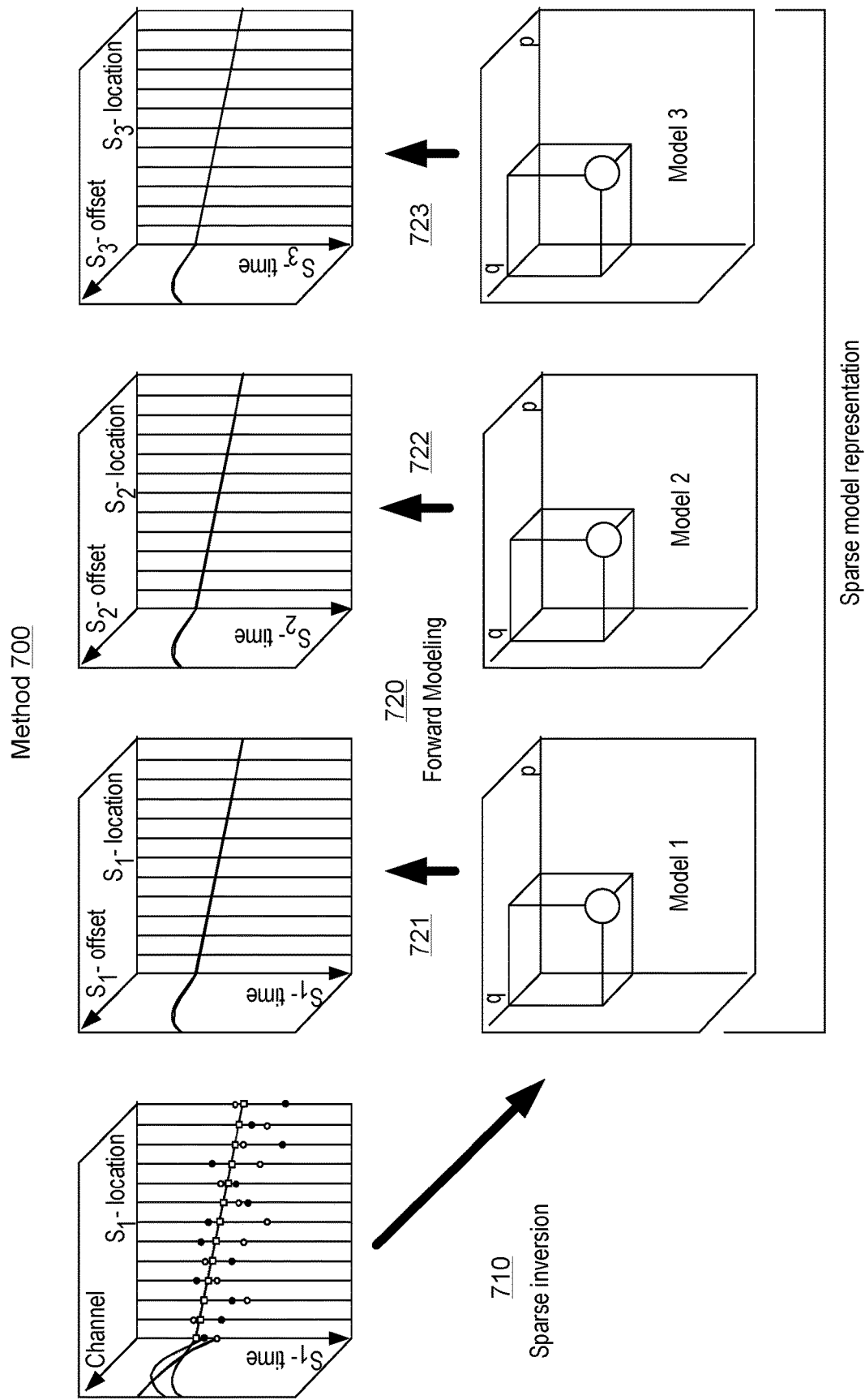
FIG. 7 illustrates an example of a method.

FIG. 7 shows an example of a method 700 that includes performing sparse inversion 710 and forward modeling 720, which can include forward modeling 721, 722 and 723 for a plurality of individual models (see, e.g., models 1, 2 and 3).

The method 700 can include receiving data for three reflections generated by three sources at different spatial positions on a number of shot records. As an example, source firing time dither patterns may be encoded in acquired signals such that the encoded dither patterns allow for differentiation between energy from individual sources, for example, per an iterative sparse inversion algorithm. In such an example, sparse models may be generated for each of the individual sources (see, e.g., sparse model representations in FIG. 7). As illustrated in FIG. 7, the method 700 can include forward modeling, which can include transforming a plurality of individual models to generate separated source components. For example, where data for three sources are received, three models may be generated and transformed to output separated components for the three sources.

As an example, a survey may employ a narrow-azimuth (NAZ) acquisition technique, a wide-azimuth (WAZ) acquisition technique, or one or more other acquisition techniques. As an example, a water-based survey may employ one or more vessels, one or more buoys, etc. As an example, a survey may be an amplitude variation with angle of incidence (AVA) and/or an amplitude variation with angle of offset (AVO) type of survey.

As to AVO, a variation in seismic reflection amplitude with a change in distance between shotpoint and receiver can be utilized for determining information that can indicate differences in lithology and fluid content in rocks above and/or below a reflector. Through AVO analysis, a geophysicist may attempt to determine thickness, porosity, density, velocity, lithology and fluid content of rocks. AVO analysis can involve particular processing of seismic data and seismic modeling to determine rock properties with a known fluid content. With such knowledge, it may be possible to model other types of fluid content. For example, a gas-filled sandstone might show increasing amplitude with offset; whereas, a coal might show decreasing amplitude with offset. As an example, AVO analysis with P-energy alone can at times fail to yield a unique solution (e.g., AVO results may be prone to misinterpretation). As an example, consider a misinterpretation that fails to distinguish a gas-filled reservoir from a reservoir having partial gas saturation ("fizz water"). AVO analysis using source-generated or mode-converted shear wave energy may allow for differentiation of degrees of gas saturation. AVO analysis tends to be more informative in young, poorly consolidated rocks, such as those in the Gulf of Mexico, when compared to older, well-cemented sediments.

As an example, where multiple sources are fired simultaneous, so-called seismic interference can exist. For example, acquired data sensed for multiple sources that are fired simultaneously can include interference (e.g., wavefield interference). In such an example, a technique that can separate components of individual sources may act to reduce (e.g., "remove") interference, which may be considered to be source-generated interference.

As mentioned, interference may also exist where energy from multiple shots in a discrete shot survey (see, e.g., the one source at a time example in FIG. 4) arrive at a seismic sensor over a common span of time (e.g., an acquisition time, as may be specified by an acquisition window, etc.).

Interference, ghosting, etc. may be considered to be sources of and/or forms of noise. As an example, interference may arise due to one or more survey parameters. For example, consider shot-to-shot interval parameter of X seconds and a record length parameter of Y seconds. In such an example, where the shot-to-shot interval parameter is less than the record length parameter (e.g., X<Y), interference may be recorded. As an example, consider a survey where X is about 12 second and where Y is about 16 seconds. In such an example, data may exhibit deep interference that is about 40 dB or more than underlying signal. As an example, a survey parameter such as a shot-to-shot interval parameter may be specified as a time and/or as a distance (e.g., consider moving equipment).

As an example, technology such as, for example, the SIMSOURCE™ technology (Schlumberger Limited, Houston, Tex.), may be implemented for simultaneous seismic source acquisition and processing. Simultaneous seismic source acquisition can acquire data that differ from single seismic source sequential acquisition data in that an individual trace can include multiple shot locations associated with it as well as, for example, dither (e.g., as encoded via one or more sources).

As explained with respect to FIG. 7, data may be provided as volumetric data (e.g., a seismic cube, etc.), for example, in the form of traces. As an example, a coordinate dimension of such data may be time or distance. For example, data may be specified using distance or time and distance. Acquired data may be considered to be in an acquisition domain (e.g., or a "shot domain") such as a spatial domain, optionally with a time axis that may be a proxy for depth (e.g., time as a proxy for distance). Where noise may exist, an attenuation method may be applied to data in the acquisition or shot domain; noting that such a method, where applied before separation, may aim to preserve information from multiple sources.

As an example, a noise attenuation method may be applied to multi-source data in an acquisition or shot domain where acquired signal from the multiple sources is coherent. As an example, in one or more other types of domains, the signal from a source of multiple sources may lack coherence and a noise attenuation may undesirably attenuate that signal.

As mentioned, a separation process may employ a sparse inversion algorithm, for example, to common channels. In such an example, sparseness may be promoted using a time-domain, linear Radon transform that effectively separates each trace into estimated components for each source, optionally also to generate a residual of unseparated energy. In such an example, the residual can include ambient noise and signal that has not been modeled (e.g., signal that may be too weak, complex, etc.). As an example, a residual may optionally be added back to separated data for one or more of multiple sources. After separation, data volume may be a multiple of number of sources (e.g., if two sources, data volume may be doubled). As an example, a separated data volume may include traces associated with a single source. In such an example, the data volume may be in a domain such as the original acquisition or shot domain.

As an example, a noise attenuation method may be applied to one or more separated data volumes. As an example, a noise attenuation method may be applied to data acquired using a sequential firing technique, data acquired using a simultaneous firing technique or data acquired using another type of technique.

As an example, a method can be applied to data of a data domain where a portion of the data in the data domain can be noisy, for example, the contribution of noise may exceed the contribution of signal such that a signal to noise ratio is less than one and, for example, may be an order or more less than one (e.g., consider a signal to noise ratio of about 0.1, or about 0.01, etc.). Processing can act to attenuate noise, which may include, for example, extracting signal and/or extracting noise (e.g., noise removal or noise attenuation). A result can be or include noise attenuated data.

Figure 8:
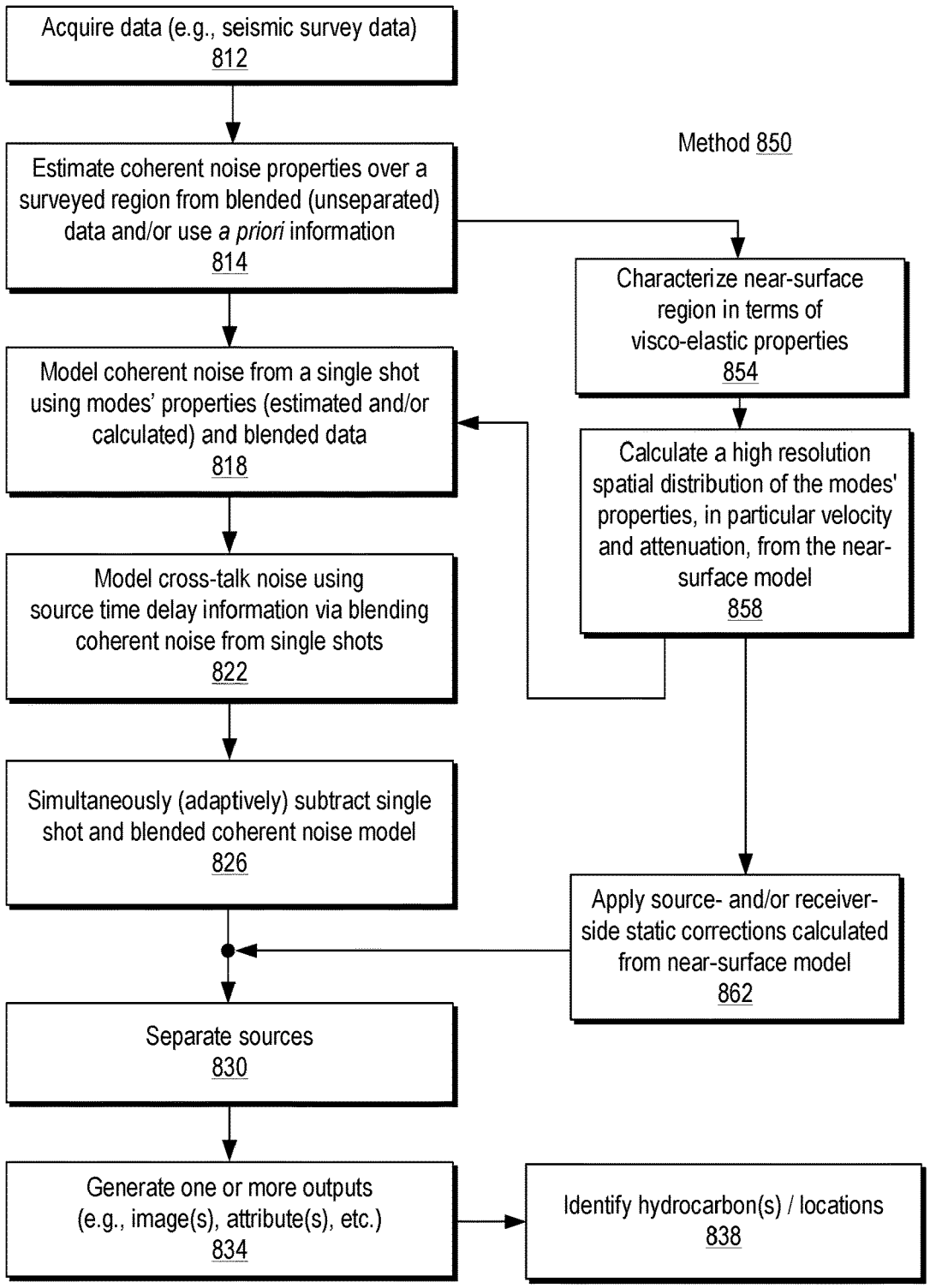
FIG. 8 illustrates examples of methods.

FIG. 8 shows an example of a method 810 and an example of a method 850 that can be optionally implemented in conjunction with the method 810. As shown, the method 810 includes an acquisition block 810 for acquiring data (e.g., seismic survey data), an estimation block 814 for estimating coherent noise properties over a surveyed region from blended (unseparated) data and/or using a priori information, a model block 818 for modeling coherent noise form a single shot using one or more mode's properties (e.g., estimated and/or calculated) and blended data, a model block 822 for modeling cross-talk noise using source time delay information via blending coherent noise form single shots, a subtraction block 826 for simultaneously (e.g., adaptively) subtracting single shot and blended coherent noise model, a separation block 830 for separating multiple sources, a generation block 834 for generating one or more outputs (e.g., image, images, attribute, attributes) from separated source information for at least one of the separated sources, and an identification block 838 for identifying at least one hydrocarbon and/or one or more hydrocarbon locations. As mentioned, survey data (e.g., AVO, etc.) may be analyzed to determine information about one or more types of fluids, which can include one or more hydrocarbon fluids.

As an example, a method can include performing one or more field operations as to development of a geologic environment, for example, as to extraction of fluid from the geologic environment. In such an example, a fluid or fluids can be and/or include a hydrocarbon fluid or hydrocarbon fluids.

As an example, estimating coherent noise properties can include, for example, receiving seismic data acquired by receivers in a survey of a region, the region being associated with locations; processing the seismic data to estimate at least one frequency dependent surface wave property over the region; locally determining frequency dependent data processing geometries across the region (e.g., via determining a frequency dependent data processing geometry for each location based at least in part on said at least one estimated frequency dependent surface wave property evaluated at said each location, the frequency dependent data processing geometry identifying a geometry-based selection of the receivers); and processing the seismic data in a processor-based machine based at least in part on the determined data processing geometries to derive a spatially continuous representation of a surface wave property across the region. In such an example, the seismic data can include blended seismic data. As an example, a method as described in Strobbia, C. L., and A., Glushchenko, 2013, Continuous adaptive surface wave analysis for three-dimensional seismic data, U.S. Pat. No. 8,509,027 B2, which is incorporated by reference herein, and/or Strobbia, C. L., 2011, Modeling and filtering coherent noise in seismic surveying, U.S. Pat. No. 7,917,295 B2, which is incorporated by reference herein, may be implemented and applied to blended seismic data.

As an example, the acquisition block 812 can include acquiring time data that corresponds to emission times for the sources. For example, such time data may be GPS associated time data with location and firing information. Forward blending can be performed for a plurality of coherent noise models for a corresponding plurality of sources to output a noise model and interference. Such an approach can be a simulation of an acquisition for a coherent noise model.

As discussed, simultaneous source (blended) acquisition can aim to increase acquisition efficiency by activating a second source while still recording the Earth's reflections from a first source. Such a data acquisition or survey technique can provide for cost saving and/or allow a denser survey to be acquired in the same time. However, signal overlap also results in cross-talk noise contamination which can be handled in processing.

As an example, a workflow can handle cross-talk noise by attenuating the cross-talk noise (e.g., filtering, reducing, removing, etc.) near the start of a processing sequence, a process referred to as active deblending. Such an approach can rely on introduction of random but known small variations in source firing times from shot to shot. The use of such firing times ensures that cross-talk noise has an impulsive character in domains other than the common shot. The data can then be deblended, for example, by attenuating the cross-talk noise using impulsive denoising techniques (e.g. Stefani et al. 2007).

As an example, other deblending techniques can focus on an iterative incremental removal of the cross-talk noise (e.g., Doulgeris et al. 2010) or on simultaneously deriving model representations for both sources based on source firing time information (e.g., Akerberg et al. 2008 or Moore et al. 2008). The latter group of techniques, which exploit signal coherency (and crosstalk noise incoherency) to justify sparse models, tends to be less reliable in the presence of high-amplitude coherent noise like surface- and guided-waves in land and shallow water environments (Henin et al., 2015; Shipilova et al., 2016).

A method such as the method 810 of FIG. 8 can aim to address such coherent noise. For example, the method 810 can provide for some amount of attenuation of coherent noise prior to processing as to source separation. As an example, the method 810 can be implemented as a surface- and guided wave attenuation workflow that may extend one or more other techniques (see, e.g., Strobbia (2011), Strobbia and Glushchenko (2013), Boiero (2016) and Kashubin and Boiero (2016)).

As an example, an active deblending workflow can include: estimating coherent noise properties over a surveyed region from blended data; characterizing a near-surface in terms of visco-elastic properties (e.g., optional); calculating a high resolution spatial distribution of the modes' properties, in particular velocity and attenuation, from the near-surface model (e.g., optional); using the modes' properties and the blended data to model coherent noise from a single shot; blending coherent noise from single shots to model cross-talk noise using source time delay information; simultaneously (adaptively) subtracting single shot and blended coherent noise model; applying source- and receiver-side static corrections calculated from near surface model (e.g., optional); and separating sources (e.g., using one or more techniques).

Referring again to FIG. 8, the method 850 includes a characterization block 854 for characterizing a near-surface region in terms of visco-elastic properties; a calculation block 858 for calculating a high resolution spatial distribution of the modes' properties, in particular velocity and attenuation, from the near-surface model; and an application block 862 for applying source side and/or receiver side static correction(s) as calculated from the near-surface model.

Figure 9:
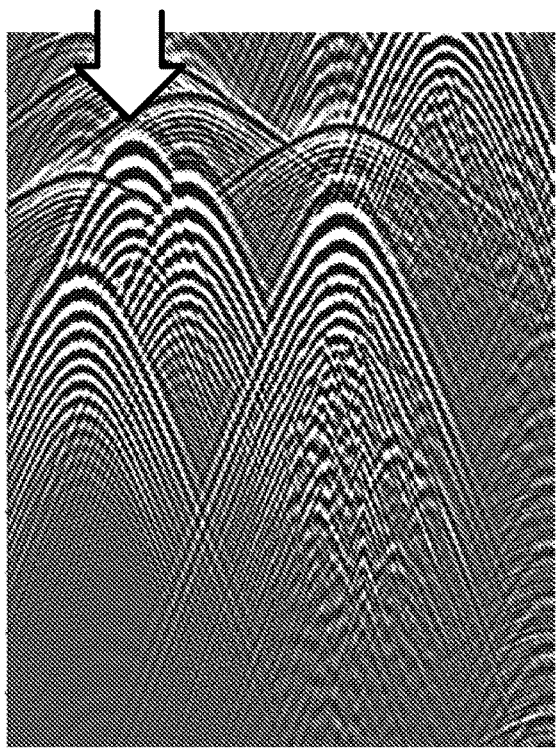
FIG. 9 illustrates examples of images.
Figure 9:
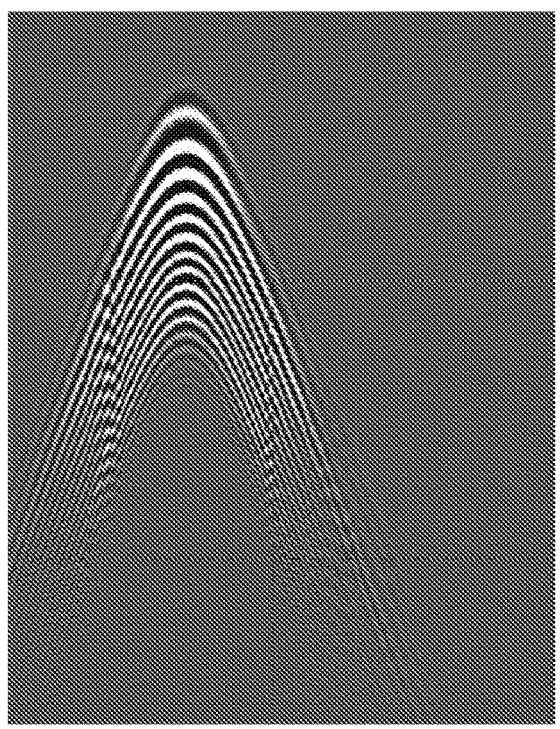

FIG. 9 shows an example of blended shots in a common shot gather image 910 from a seismic survey. As shown, the shot gather is obtained via an acquisition technique that involves firing multiple sources in the same acquisition time window. The data of the image 910 of FIG. 9 may be referred to as blended acquisition data. In the image 910, a surface wave mode is indicated by an arrow for a specific individual seismic energy source within the blended time window (e.g., as may be a parameter of a so-called simultaneous source survey), which is more specifically shown in an image 930 of FIG. 9 as the surface wave mode estimated for the specific source (indicated by the arrow) within the blended time window in a common shot gather.

In such an acquisition approach, strong events interfering in the time window can be near-surface or near-seabed related. The near-surface (seabed) can be generally described as a layered waveguide in which the upper boundary is the free-surface (seabed) and the lower boundary is the bottom of the weathering layer. A relatively large part of the wavefield recorded in surface seismic consists of energy trapped in this waveguide, which manifests itself in the form of surface- and guided-waves and is generally referred to as coherent or source-generated noise. Such energy might include several modes of Rayleigh waves (e.g., Scholte waves in shallow-water environments), Lamb waves (e.g., when strong velocity inversions are present), Love waves (e.g., on horizontal components when properly excited), Stoneley waves (e.g., that tend to propagate along a solid-fluid interface, and, more rarely, a solid-solid interface), and guided P- and S-waves. In various cases, some of these modes may be present simultaneously and can be superimposed on each other. One or more different modes may dominate propagation, depending on local conditions, even within a single survey.

Figure 10:
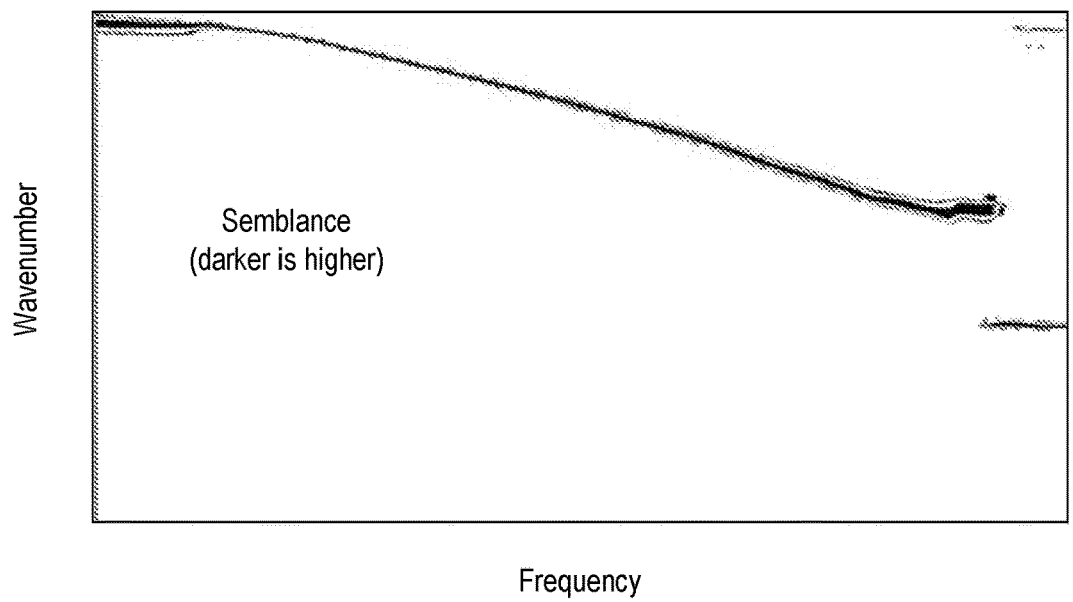
FIG. 10 illustrates examples of plots.
Figure 10:
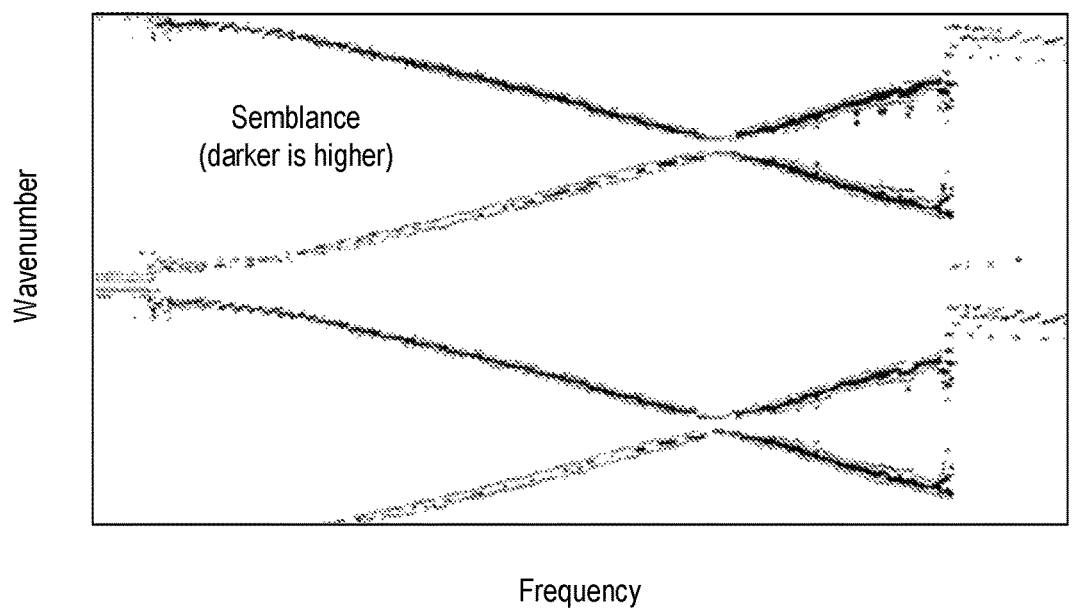

FIG. 10 shows F-K semblance plots 1010 and 1030 evaluated from data in the blended image 930 of FIG. 9. In FIG. 10, the horizontal axis represents frequency whereas the vertical axis represents wavenumber. The plot 1010 includes the part of the line with low cross-talk noise contamination and the plot 1030 includes the part of the line with high cross-talk noise contamination. Such an approach can be utilized to determine an amount of cross-talk noise contamination in seismic survey data.

As an example, the continuous adaptive surface wave analysis proposed by Strobbia et al. (2010) can be adapted to estimate coherent noise properties over a simultaneous-source surveyed area. Such an estimation can be for example, based on the use of high-resolution, unevenly spaced F-K semblances, to estimate the local properties within a patch of receivers. Such an approach can allows for a robust property estimation even in the case of aliased coherent noise (Strobbia et al., 2011).

As an example, a workflow can consider that a common physical principle of different surface- and guided-waves is related to the fact that their penetration depends on their wavelengths, which, in turn, causes dispersion (e.g., different frequencies have different phase velocity). In such an example, the dispersion can be deemed to be strictly related to local properties, and hence, can be inverted to infer a near-surface velocity model (see, e.g., Strobbia et al., 2010). As an example, one or more near surface velocity models can also be used to compute static corrections to be applied before deblending (e.g., as desired).

In the example plot 1010 of FIG. 10, the case of low cross-talk noise contamination is illustrated where it is possible to identify a mode of propagation; whereas, the plot 1030 shows what happens in case high interference with the appearance of negative velocity events, which may be rejected. As an example, cross-line noise may also decrease the semblance resolution; noting that it does not represent an obstacle in the estimation of coherent noise properties.

As an example, once coherent noise properties have been estimated, the propagation of a surface/guided wave v for a given frequency w can be written as a sum of laterally propagating modes:

$$v(x,\omega,s) = \Sigma_m \phi_m(z,\omega,x_h) A_m(x_h,\omega,s_h) \exp(i\omega\tau_m(x_h,\omega,s_h))$$
$$\phi_m(s_z,\omega,s_h) \qquad (1)$$

where x and s are spatial coordinates, $x_h$ and $s_h$ are horizontal coordinates of receivers and sources, and z and $s_z$ are depths of receivers and sources, respectively.

Kinematic aspects of guided-wave propagation follow from the traveltimes $\tau_m$, which can be computed from the phase velocity fields. The geometrical spreading, the intrinsic attenuation and the leakage may be accounted for in the amplitudes $A_m$. As an example, local structure of a medium beneath source and receivers may follow from the modal amplitudes $\phi_m$.

Figure 11:
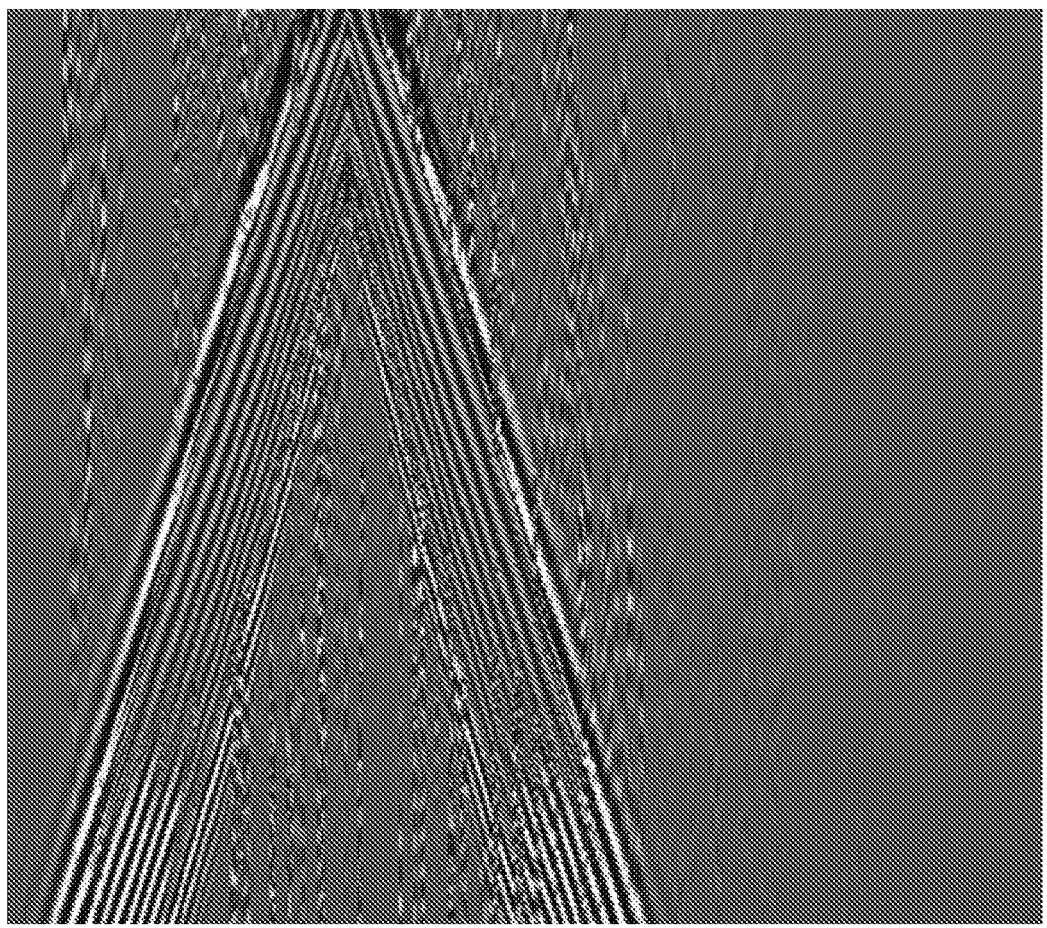
FIG. 11 illustrates an example of an image.

FIG. 11 shows a plot 1110 from forward blending of coherent noise models from sources interfering in a specific window time for a common receiver gather.

Figure 12:
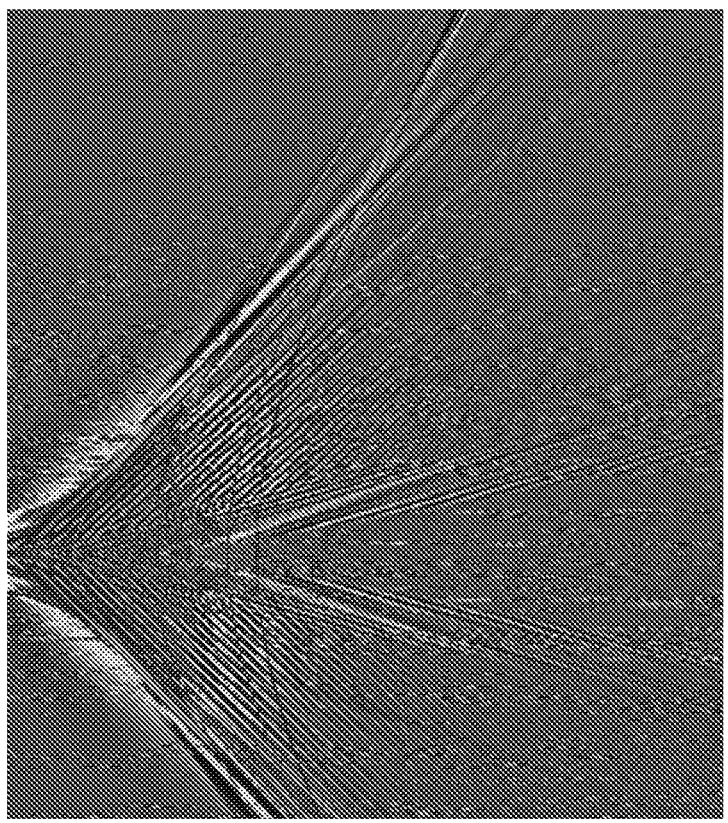
FIG. 12 illustrates examples of images.
Figure 12:
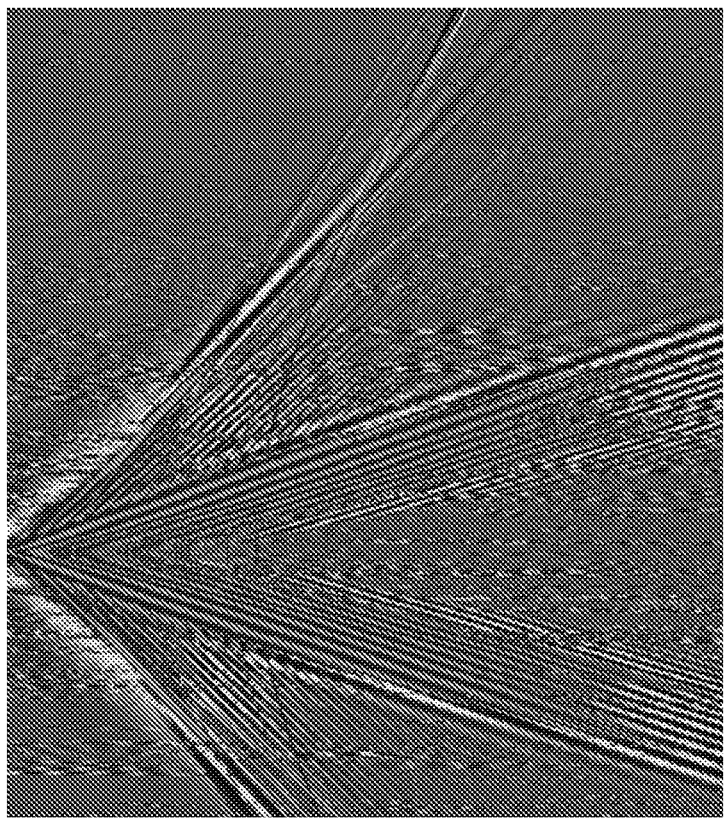

FIG. 12 shows plots 1210 and 1230 of a common receiver gather before and after coherent noise removal, respectively.

As the firing time of a source of the sources in FIG. 9 may be taken as known, a method can include forward blending a coherent noise model (see, e.g., FIG. 11) for the different source and (adaptively) subtracting them simultaneously from one or more of the time windows (see, e.g., FIG. 12).

Given a workflow that includes one or more of the processes that can arrive at information such as the information shown in FIG. 12, one or more deblending technique may be applied that exploit(s) signal coherency (e.g., and crosstalk noise incoherency) to justify sparse models, which may be applied in a more reliable way.

As an example, the method 810 of FIG. 8 (e.g., optionally in conjunction with one or more aspects of the method 850)

may be implemented to provide output as in FIG. 12, in particular, as in the plot 1230 of FIG. 12. For example, the method 810 may be implemented to reduce coherent noise of a common gather. Such an approach may enhance robustness of one or more techniques for source separation. As an example, such an approach may enhance robustness of a method such as the method 700 of FIG. 7.

Figure 13:
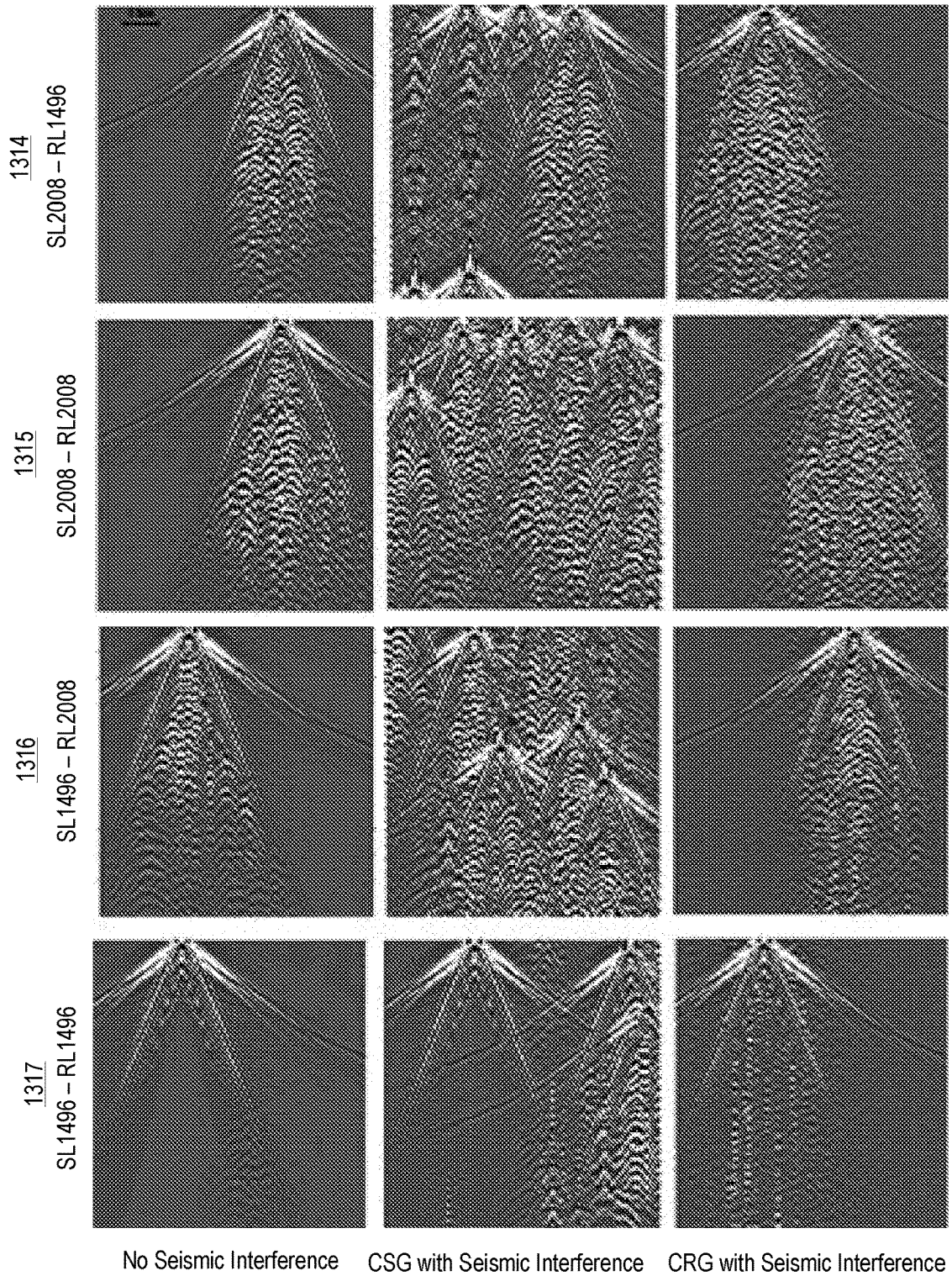
FIG. 13 illustrates examples of images.

FIG. 13 shows images 1300 of seismic data acquired using firing sequences (see, e.g., FIG. 6). Specifically, FIG. 13 shows a series of images 1314, a series of images 1315, a series of images 1316 and a series of images 1317 that correspond to different acquisitions, which are given in terms of shot line (SL) and in terms of receiver line (RL).

In FIG. 13, the images 1314 show the case of un-blended data where the delay between sources is larger than approximately 6 seconds (so a source is fired after the maximum window time). In the images 1314, the image in the middle shows an example of a line of receivers (see, e.g., receiver line in FIG. 6) recording "simultaneous" sources whereas the image on the right shows a line of sources recorded by one receiver (see, e.g., triangle in FIG. 6). The images 1315, 1316 and 1317 of FIG. 13 may be understood with respect to the images 1314 for the survey lines as indicated to the left (e.g., SLXXXX–RLYYYY).

As mentioned, data may be deblended, for example, by attenuating the cross-talk noise using one or more impulsive denoising techniques (e.g. Stefani et al. 2007); noting that one or more other deblending techniques tend to focus on the iterative incremental removal of the cross-talk noise (e.g., Doulgeris et al. 2010) or on simultaneously deriving model representations for both sources based on source firing time information (e.g., Akerberg et al. 2008 or Moore et al. 2008).

Figure 14:
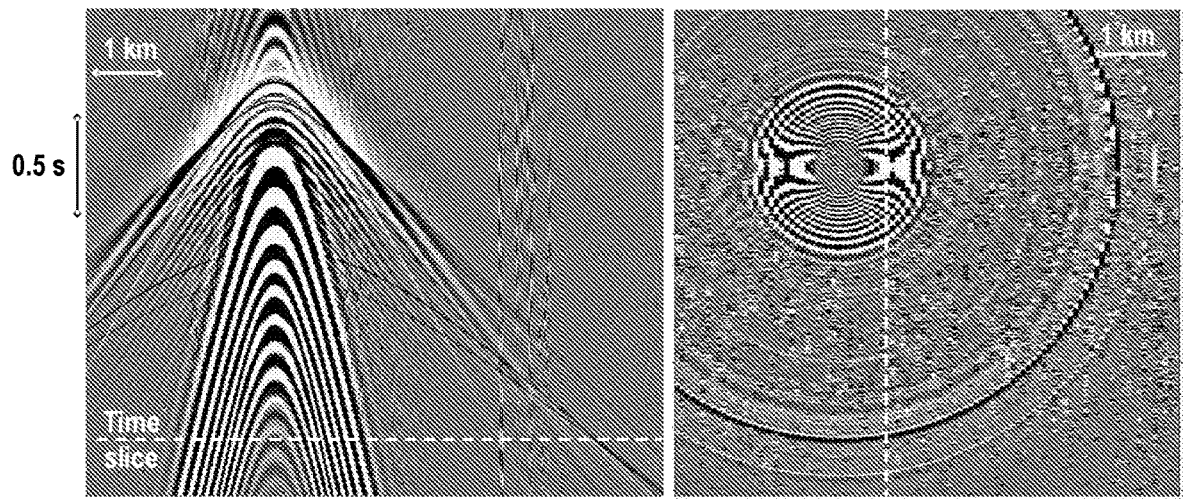
FIG. 14 illustrates examples of images.
Figure 14:
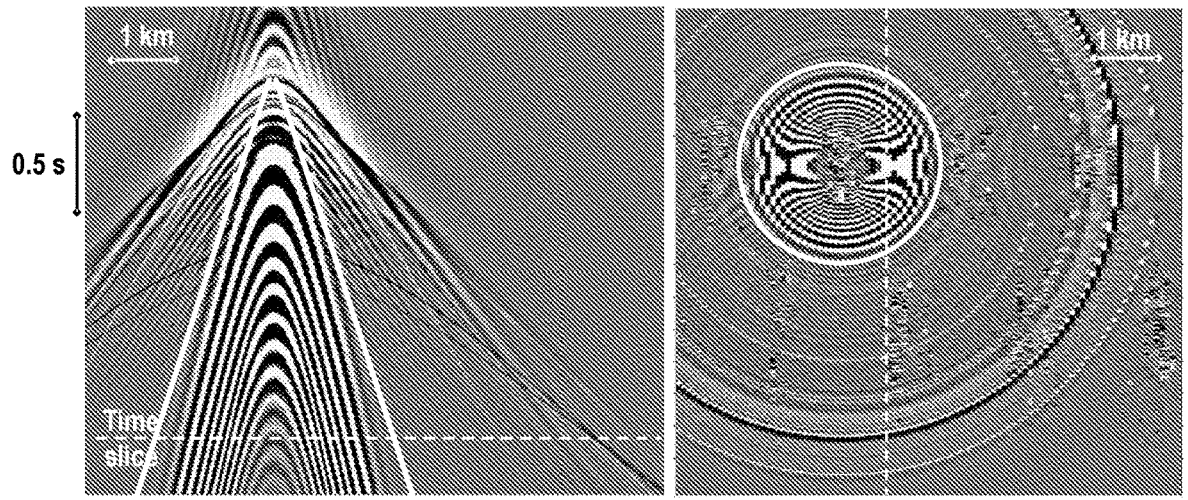
Figure 14:
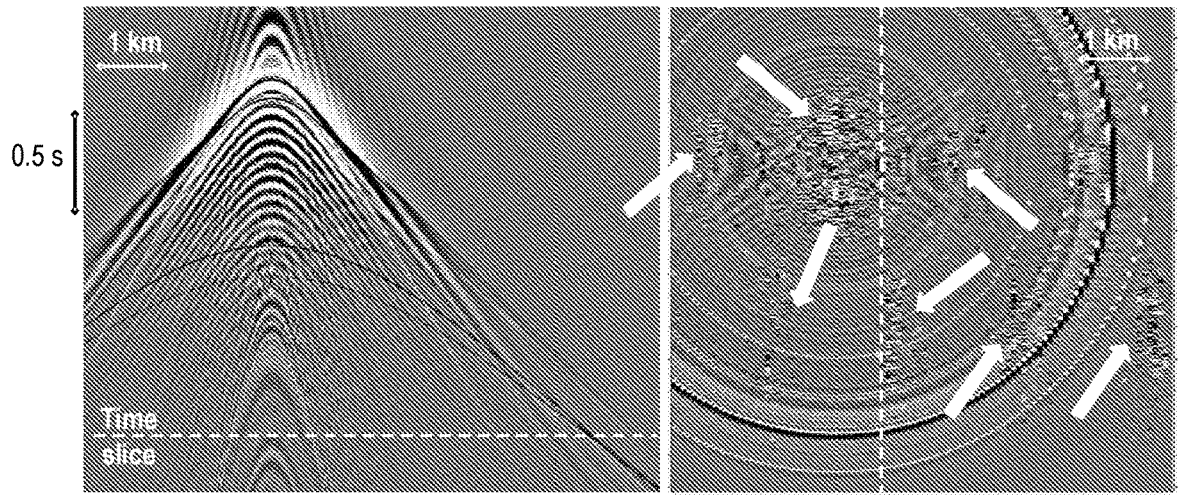

FIG. 14 shows images 1418, 1419 and 1420 that illustrate a deblending procedure based on Moore at al., 2008. The data in the images 1418 is before deblending where, on the left hand side is a common receiver gather (the sources acquired by the black triangle receiver in FIG. 6) and on the right hand side is a time slice (the receivers laid down over the area in FIG. 6 at a certain time).

The images 1419 of FIG. 14 show seismic data after deblending. As shown, cross-talk (interference) from other sources has been attenuated. In a workflow, a processing sequence may aim to attenuate the coherent noise (e.g., the high energy part of the wavefield highlighted by the white triangle and white circle in FIG. 19).

The images 1420 of FIG. 14 show results of processing to attenuate noise identified in the images 1419. As shown in the images 1420, patterns of interference still remain in the data (especially visible in the time slice on the right—red arrows). The group of techniques, which exploits signal coherency (and crosstalk noise incoherency) to justify sparse models (Moore at al., 2008 belongs to this category), which tend to be less reliable in the presence of high-amplitude coherent noise like surface- and guided-waves in land and shallow water environments (Henin et al., 2015; Shipilova et al., 2016).

Figure 16:
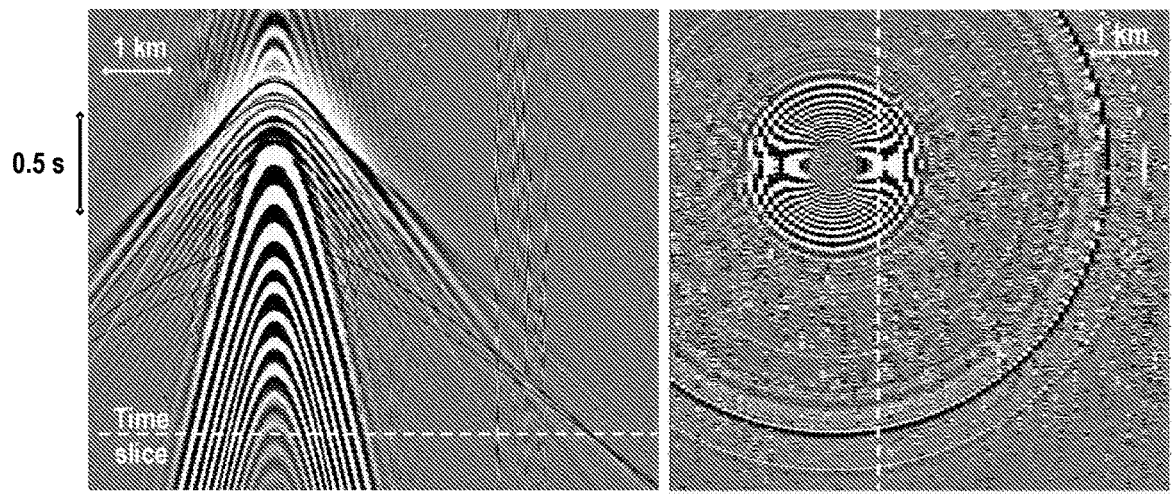
FIG. 16 illustrates examples of images.
Figure 16:
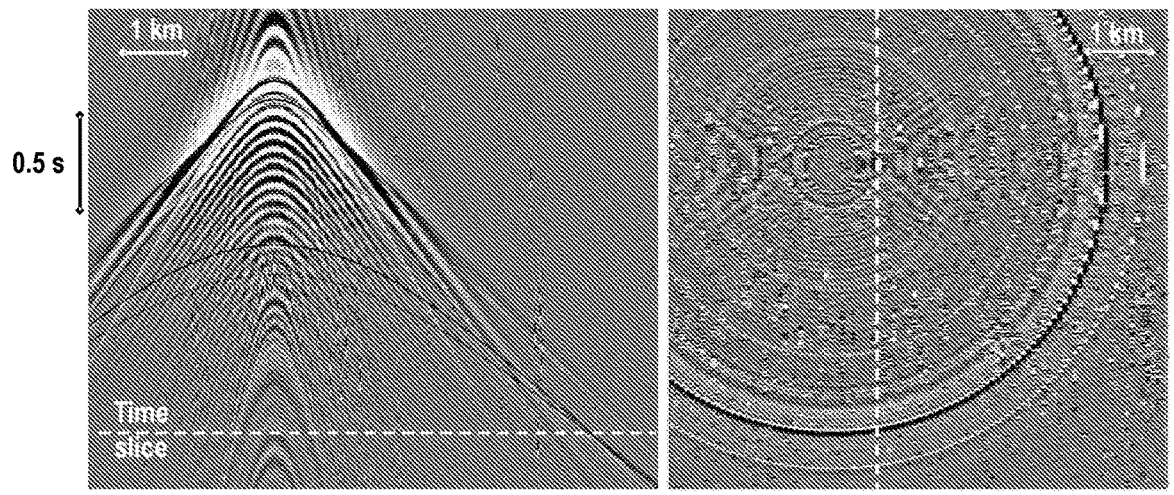
Figure 16:
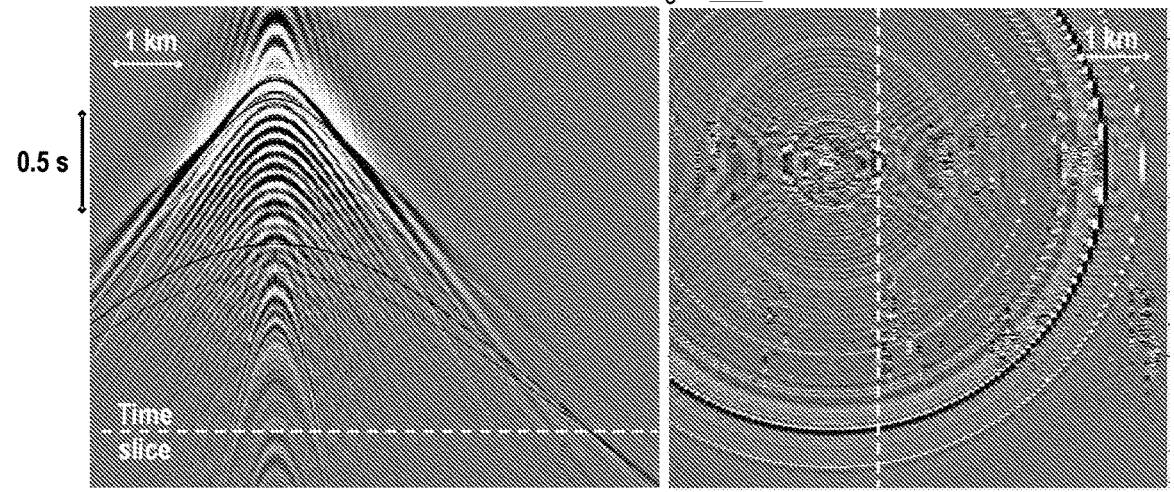

A method such as the method 810 of FIG. 8 can include estimating coherent noise properties over a surveyed region from blended data (see, e.g., FIG. 16) and, for example, use the properties and the blended data to model coherent noise from a single shot (see, e.g., FIG. 16).

To address the noise illustrated in the images 1420 of FIG. 14, a method such as the method 810 of FIG. 8 can include attenuating coherent noise before source separation. As an example, an active deblending workflow can include: estimate coherent noise properties over a surveyed region from blended data; characterize the near-surface in term of visco-elastic properties (optional); calculate a high resolution spatial distribution of the modes' properties, in particular velocity and attenuation, from the near-surface model (optional); use the modes' properties and the blended data to model coherent noise from a single shot; blend coherent noise from single shots to model cross-talk noise using source time delay information; simultaneously (adaptively) subtract single shot and blended coherent noise model; apply source- and/or receiver-side static corrections calculated from near-surface model (optional); and, for example, separating sources using one or more techniques.

Figure 15:
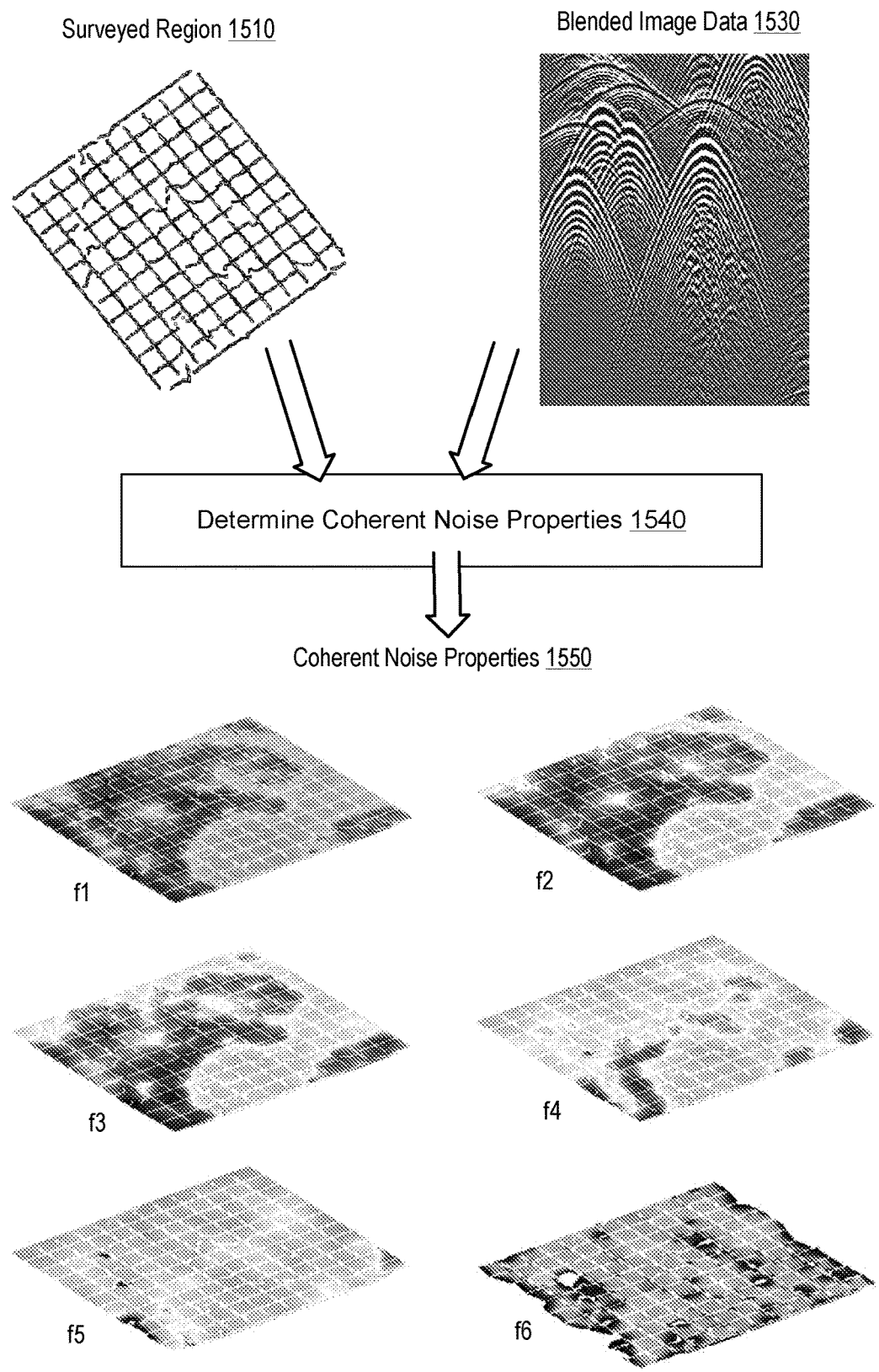
FIG. 15 illustrates an example of a method.

FIG. 15 shows an approach to estimate coherent noise properties as shown in graphics 1550 of coherent noise properties as distributed spatially with respect to various frequencies as corresponding to a surveyed region 1510 from blended data 1530. Such a process may include one or more implementation of one or more techniques described in Strobbia, C. L., and A., Glushchenko, 2013, Continuous adaptive surface wave analysis for three-dimensional seismic data, U.S. Pat. No. 8,509,027 B2, which is incorporated by reference herein.

In the example of FIG. 15, the properties are given in terms of phase velocity with respect to frequency (e.g., f1, f2, f3, f4, f5 and f6) and location (e.g., two dimensional region defined by north and east directions).

In the graphic 1550, the properties are spatially distributed and can provide indications as to different surface- and guided-waves with respect to coherent noise. Such noise tends to be related to penetration that depends on their wavelengths, which, in turn, causes dispersion (e.g., different frequencies having different phase velocities). The dispersion tends to be related to the near-surface properties, which can vary within a surveyed region and hence can be inverted to infer one or more velocity models.

Referring again to FIG. 9, it shows use of the coherent noise properties such as those of the graphic 1550 of FIG. 15 and the blended data (image 910) to model coherent noise from a single shot (image 930) where the arrow identifies a single shot in left hand side) (see, e.g., Strobbia, C. L., 2011, Modeling and filtering coherent noise in seismic surveying, U.S. Pat. No. 7,917,295 B2, which is incorporated by reference herein).

Referring again to FIG. 9 consider a workflow that, as the firing time of a source of the sources (see, e.g., FIG. 6) can be known, it can be possible to forward blend the coherent noise model for the different source and (adaptively) subtract them simultaneously from a time window.

Referring to FIG. 12, a common receiver gather before as image 1210 and after as image 1230 coherent noise removal are shown. FIG. 16 shows images 1622, 1623 and 1624 as to how a method such as the method 810 can be applied to data as in the sequence of FIG. 14 images 1418, 1419 and 1420.

Figure 17:
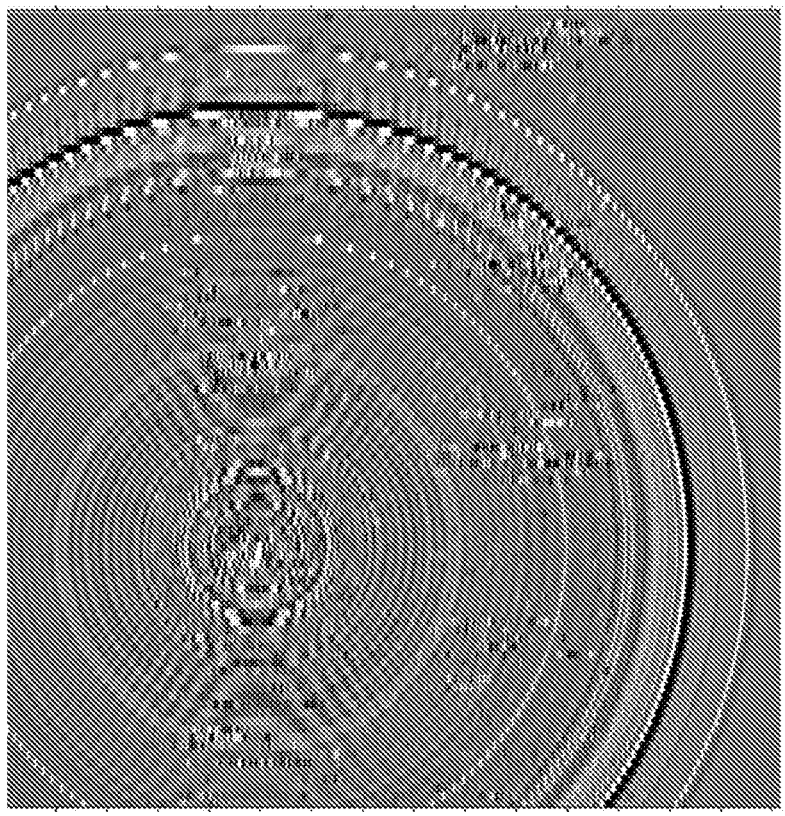
FIG. 17 illustrates examples of images.
Figure 17:
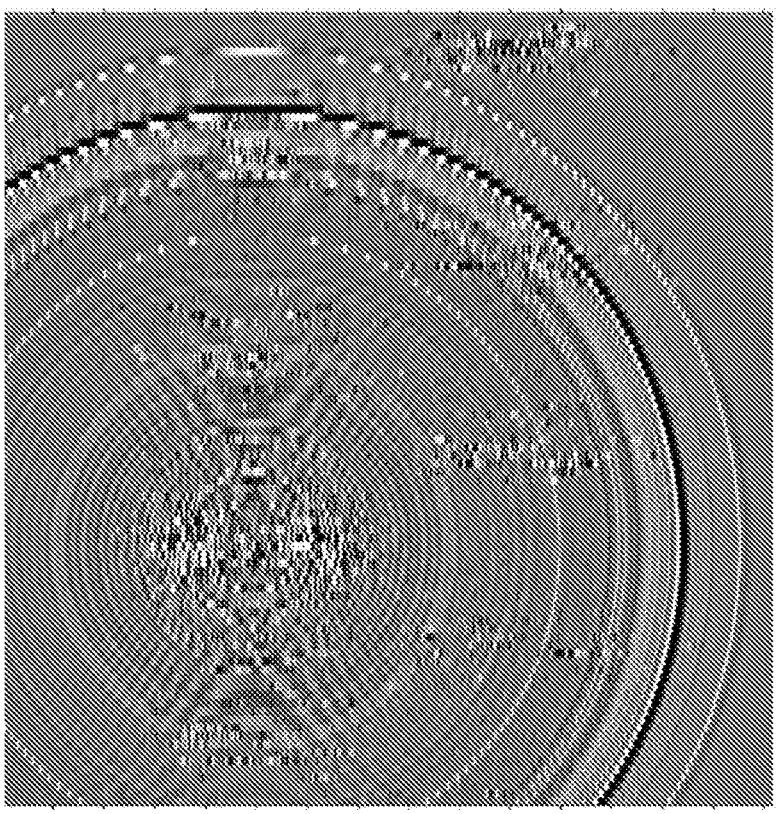

FIG. 17 shows a comparison between the image 1420 and the image 1624. As to the image 1624, the deblending utilized was that of Moore et al. (2008). As seen, a method such as the method 810 of FIG. 8 can reduce noise (e.g., attenuate noise).

As mentioned, the approach of the method 810 can be utilized to enhance data utilized in a sparse model approach (see, e.g., FIG. 7). As mentioned, data as in the image 1420 of FIG. 14 with noise can confound a sparse model approach; whereas, data as in the image 1624 of FIG. 16 may make a sparse model approach more robust.

While the example of FIG. 15 show a particular type of property, one or more other properties may be utilized, for example, additionally and/or alternatively. As an example, one or more frequency properties may be utilized, one or more attenuation properties may be utilized, and one or more amplitude properties may be utilized.

As an example, a method may be applied to data acquired that include information from 2 or more sources. As an example, for a marine survey, a number of sources may be of the order of 2 to 3 (e.g., optionally more). As an example, for a land survey, a number of sources may be of the order of 2 or more. As an example, consider a scenario that may utilize a plurality of vibrator trucks (e.g., consider 2, 3, 4, 5, 6, 7, 8, 9 or more). In such an example, data may include information from a plurality of sources, which may be less than or equal to a number of vibrators (e.g., vibrator trucks, etc.).

As an example, a method that includes one or more actions of the method 810 may provide for cleaner data (e.g., as to signal processing with respect to signal and noise). Such data may provide for enhanced attributes (e.g., more accurate attributes) and/or for enhanced images (e.g., more accurate images).

As an example, a method can include following amplitude of a certain event, reflector target in data. As an example, an AVO survey may be performed where acquired data are processed using one or more actions as in the method 810 such that amplitude variation with reflection angle data analysis can help to characterize porosity of a region (e.g., a reservoir, etc.), which may help in extraction of hydrocarbons, knowledge of oil content, etc. As an example, a workflow can include determining one or more petrophysical properties of rocks. As an example, a workflow can include reducing noise from one or more imaging techniques that are based at least in part on seismic survey data that includes multiple source data.

Figure 18:
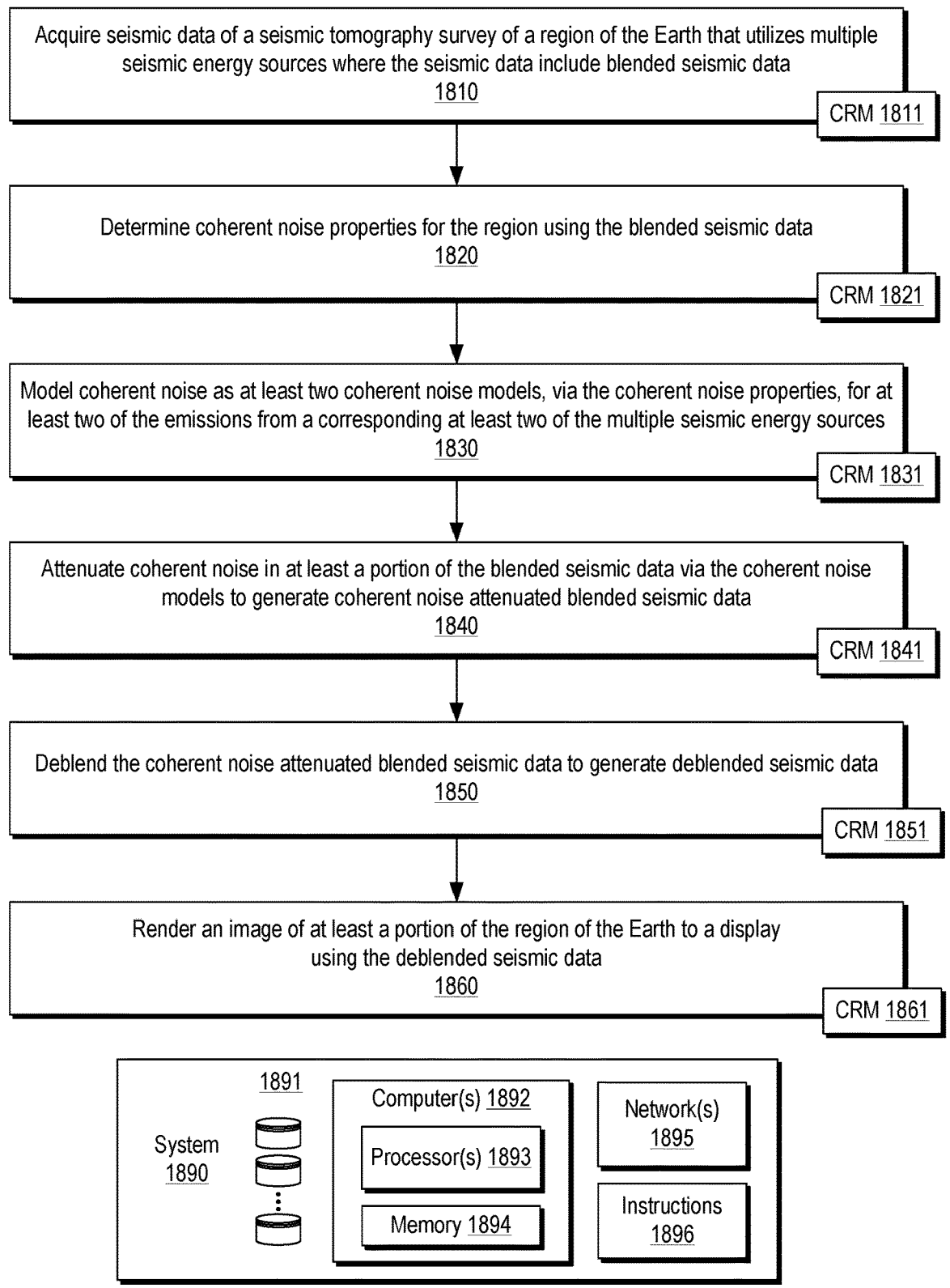
FIG. 18 illustrates an example of a method and an example of a system.

FIG. 18 shows an example of a method 1800 that includes an acquisition block 1810 for acquiring seismic data of a seismic survey of a region of the Earth that utilizes multiple seismic energy sources and seismic energy receivers where the seismic data include blended seismic data for a number of emissions from a corresponding number of the multiple seismic energy sources; a determination block 1820 for determining spatially distributed coherent noise properties for the region using the blended seismic data; a model block 1830 for, via the spatially distributed coherent noise properties, modeling coherent noise as at least two coherent noise models for at least two of the emissions from a corresponding at least two of the multiple seismic energy sources; an attenuation block 1840 for, via the coherent noise models, attenuating coherent noise in at least a portion of the blended seismic data to generate coherent noise attenuated blended seismic data; a deblend block 1850 for deblending the coherent noise attenuated blended seismic data to generate deblended seismic data; and a render block 1860 for rendering an image of at least a portion of the region to a display using the deblended seismic data.

FIG. 18 also shows various computer-readable media (CRM) blocks 1811, 1821, 1831, 1841, 1851 and 1861 as associated with the blocks 1810, 1820, 1830, 1840, 1850 and 1860. Such blocks can include instructions that are executable by one or more processors, which can be one or more processors of a computational framework, a system, a computer, etc. A computer-readable medium can be a computer-readable storage medium that is not a signal, not a carrier wave and that is non-transitory. For example, a computer-readable medium can be a physical memory component that can store information in a digital format.

In the example of FIG. 18, a system 1890 includes one or more information storage devices 1891, one or more computers 1892, one or more networks 1895 and instructions 1896. As to the one or more computers 1892, each computer may include one or more processors (e.g., or processing cores) 1893 and memory 1894 for storing the instructions 1896, for example, executable by at least one of the one or more processors. As an example, a computer may include one or more network interfaces (e.g., wired or wireless), one or more graphics cards, a display interface (e.g., wired or wireless), etc. The system 1890 may be utilized for performing one or more actions of the method 1800. As an example, the instructions 1896 can include instructions of one or more of the CRM blocks 1811, 1821, 1831, 1841, 1851 and 1861.

As explained, it can be beneficial to speed up onshore and offshore seismic acquisition. In the offshore case, acquisition techniques can be somewhat constrained by the number of seismic sources that can be practically deployed for economic reasons; whereas, in the onshore case, the relatively low cost of a seismic vibrator may permit use of a larger variety of designs. As an example, an onshore survey or an offshore survey can employ simultaneous acquisition. Onshore, such a survey can employ simultaneous vibroseis acquisition.

As to simultaneous vibroseis acquisition, a technique can consider: (i) the type and number of sweeps emitted at each shot location; (ii) constraints on the time at which each vibrator can be activated; (iii) data quality achievable by techniques that process the data acquired with the considered acquisition scheme; and (iv) an expected productivity.

Regarding point (i), a dichotomic behavior tends to separate the trend in the Middle East from that in the rest of the world. Operators in the Middle East have increasingly adopted acquisition schemes that utilize a single sweep of a single vibrator at each shot location. Such acquisition schemes do not permit deterministic separation of simultaneous-source data. Separation can instead be formulated as an under-determined inverse problem that demands assumptions on the data for its solution.

As to point (ii), it highlights a balance between acquisition efficiency and ease of processing of acquired data. At one extreme, slip-sweep acquisition can constrain slip-times to be greater than listening times. While ease of processing may exist, productivity increases with respect to flip-flop acquisition tends to be limited. At the other extreme, an approach to acquisition can constrain solely the initial locations of the vibrators and the sectors allocated to each. It is therefore efficient to acquire, but demands substantial processing effort to address the interference. Various schemes fall between these extremes such as, for example, Managed Sources and Spread (MSS). MSS aims to leverage sophisticated capabilities of modern acquisition schemes to set flexible acquisition constraints which balance acquisition efficiency with demands on the data.

As to point (iii), the processing of simultaneous source data generally includes a separation step that simulates the corresponding data acquired sequentially. Such an approach may utilize processing algorithms can be applied after separation. For example, consider a separation algorithm that demands that the vibrators emit their sweeps at random but known times, or with some other form of randomization.

As to point (iv), balancing expected productivity with data quality involves an ability to determine a reliable productivity estimate. Given that productivity depends, in a complex way, on many variables, a sophisticated numerical simulator may be demanded that can accurately represent the variables.

As explained, some peculiarities of onshore and shallow water data, such as ground-roll and vibrator harmonics or such as mud roll respectively, can affect an ability to solve the under-determined problem of data separation. As an example, various assumptions made on the data (e.g., sparseness in some transform domain, relative amplitudes of the signals to be separated) can be modified to account for features that are particular to land data. As an example, a separation algorithm (Moore et al., 2008) as developed for offshore acquisition can be adapted to be made effective for onshore and shallow water simultaneous acquisition. As an example, such an approach can be part of a workflow where coherent noise attenuation is performed prior to deblending.

Figure 19:
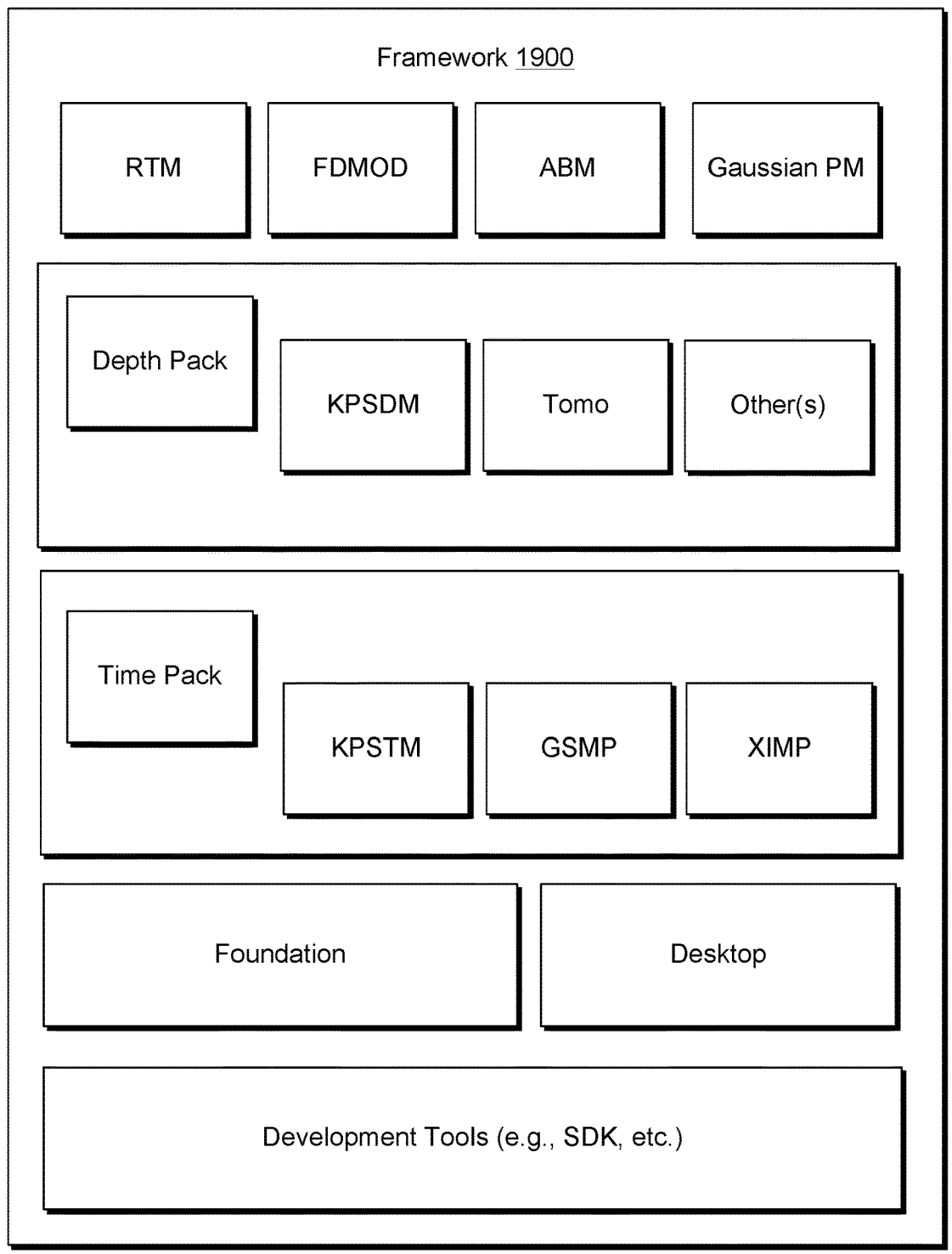
FIG. 19 illustrates an example of a computational framework.

FIG. 19 shows an example of a computational framework 1900 that can include one or more processors and memory, as well as, for example, one or more interfaces. A method or methods such as, for example, the methods of FIG. 8 and/or FIG. 18, may be performed using a computational framework that can include one or more features of the computational framework 1900 of FIG. 19. The computational framework 1900 of FIG. 19 can include one or more features of the OMEGA framework (Schlumberger Limited, Houston, Tex.), which includes Finite Difference Modelling (FDMOD) features for two-way wavefield extrapolation modelling, generating synthetic shot gathers with and without multiples. The FDMOD features can generate synthetic shot gathers by using full 3D, two-way wavefield extrapolation modelling, which can utilize wavefield extrapolation logic matches that are used by reverse-time migration (RTM). A model may be specified on a dense 3D grid as velocity and optionally as anisotropy, dip, and variable density.

As shown in FIG. 19, the computational framework 1900 includes features for RTM, FDMOD, adaptive beam migration (ABM), Gaussian packet migration (Gaussian PM), depth processing (e.g., Kirchhoff prestack depth migration (KPSDM), tomography (Tomo)), time processing (e.g., Kirchhoff prestack time migration (KPSTM), general surface multiple prediction (GSMP), extended interbed multiple prediction (XIMP)), framework foundation features, desktop features (e.g., GUIs, etc.), and development tools.

The computational framework 1900 can include features for geophysics data processing. The computational framework 1900 can allow for processing various types of data such as, for example, one or more of: land, marine, and transition zone data; time and depth data; 2D, 3D, and 4D surveys; isotropic and anisotropic (TTI and VTI) velocity fields; and multicomponent data.

The computational framework 1900 can allow for transforming seismic, electromagnetic, microseismic, and/or vertical seismic profile (VSP) data into actionable information, for example, to perform one or more actions in the field for purposes of resource production, etc. The computational framework 1900 can extend workflows into reservoir characterization and earth modelling. For example, the computational framework 1900 can extend geophysics data processing into reservoir modelling by integrating with the PETREL® framework via the Earth Model Building (EMB) tools, which enable a variety of depth imaging workflows, including model building, editing and updating, depth-tomography QC, residual moveout analysis, and volumetric common-image-point (CIP) pick QC. Such functionalities, in conjunction with the framework's depth tomography and migration algorithms, can produce accurate and precise images of the subsurface. The framework 1900 may provide support for field to final imaging, to prestack seismic interpretation and quantitative interpretation, from exploration to development.

As an example, the FDMOD component can be instantiated via one or more CPUs and/or one or more GPUs for one or more purposes. For example, consider utilizing the FDMOD for generating synthetic shot gathers by using full 3D, two-way wavefield extrapolation modelling, the same wavefield extrapolation logic matches that are used by reverse-time migration (RTM). FDMOD can model various aspects and effects of wave propagation. The output from FDMOD can be or include synthetic shot gathers including direct arrivals, primaries, surface multiples, and interbed multiples. The model can be specified on a dense 3D grid as velocity and optionally as anisotropy, dip, and variable density. As an example, survey designs can be modelled to ensure quality of a seismic survey, which may account for structural complexity of the model. Such an approach can enable evaluation of how well a target zone will be illuminated. Such an approach may be part of a quality control process (e.g., task) as part of a seismic workflow. As an example, a FDMOD approach may be specified as to size, which may be model size (e.g., a grid cell model size). Such a parameter can be utilized in determining resources to be allocated to perform a FDMOD related processing task. For example, a relationship between model size and CPUs, GPUs, etc., may be established for purposes of generating results in a desired amount of time, which may be part of a plan (e.g., a schedule) for a seismic interpretation workflow.

As an example, one or more survey designs can be modelled to ensure quality of a seismic survey. Such an approach can provide for evaluating how well a target zone will be illuminated.

A computational framework may include one or more features of the SIMSOURCE framework. As an example, computational frameworks may be integrated, operatively coupled, etc.

As an example, one or more computational frameworks may be implemented to perform at least a portion of the method 810 of FIG. 8. Such a framework or frameworks may provide for handling overlapping records and, for example, separating the signals from each source, which can makes it possible to sample the subsurface more effectively and efficiently.

As an example, a vessel and/or a truck may include computer equipment for implementation of a method such as the method 810 (e.g., or a part thereof) and/or the method 1800 (e.g., or a part thereof) where such a vessel and/or a truck can acquire seismic data.

As an example, a survey may be a multi-, wide-, or full-azimuth survey. As an example, a survey may be a seabed survey, which may include one or more of ocean-bottom node (OBN) and ocean-bottom cable (OBC).

As an example, a method can include acquiring seismic data of a survey that utilizes multiple sources where the seismic data include blended seismic data for a number of emissions from a corresponding number of the multiple sources; based at least in part on the blended seismic data, determining coherent noise properties; based at least in part on the coherent noise properties, modeling coherent noise as a coherent noise model for one of the emissions from a corresponding one of the multiple sources; and based at least in part on the coherent noise model, associating at least two portions of the blended seismic data correspondingly with at least two of the multiple sources. Such a method can include determining coherent noise properties via performing a continuous adaptive surface wave analysis, for example, consider a continuous adaptive surface wave analysis that is based at least in part on unevenly spaced F-K semblances.

As an example, associating can include separating at least two portions of the blended seismic data from blended seismic data to form at least two separate sets of seismic data. Such an approach can include storing the at least two separate sets of seismic data.

As an example, associating can associate a first portion of blended seismic data with a first one of multiple sources and associates a second portion of the blended seismic data with a second one of the multiple sources. Such an approach may include utilizing sparse models.

As an example, coherent noise properties can correspond to a wave mode.

As an example, data from a simultaneous source acquisition survey may be utilized, which may be a marine survey or a land survey.

As an example, a method can include blending coherent noise for a number of emissions from a corresponding number of multiple sources to model cross-talk noise. Such a method may utilize source time delay information.

As an example, coherent noise properties can correspond to a wave mode.

As an example, blended seismic data can correspond to a corresponding time window. In such an example, estimating a surface wave mode for one of a plurality of emissions from a corresponding one of multiple sources can be within the time window.

As an example, a method can include forward modeling (e.g., forward blending) a coherent noise model and at least another coherent noise model.

As an example, a system can include a processor; memory operatively coupled to the processor; and processor-executable instructions stored in the memory to instruct the system to: acquire seismic data of a survey that utilizes multiple sources where the seismic data includes blended seismic data for a number of emissions from a corresponding number of the multiple sources; based at least in part on the blended seismic data, determine coherent noise properties; based at least in part on the coherent noise properties, model coherent noise as a coherent noise model for one of the emissions from a corresponding one of the multiple sources; and based at least in part on the coherent noise model, associate at least two portions of the blended seismic data correspondingly with at least two of the multiple sources.

As an example, one or more computer-readable storage media can include processor-executable instructions to instruct a computing system to: acquire seismic data of a survey that utilizes multiple sources where the seismic data include blended seismic data for a number of emissions from a corresponding number of the multiple sources; based at least in part on the blended seismic data, determine coherent noise properties; based at least in part on the coherent noise properties, model coherent noise as a coherent noise model for one of the emissions from a corresponding one of the multiple sources; and based at least in part on the coherent noise model, associate at least two portions of the blended seismic data correspondingly with at least two of the multiple sources.

As an example, a method can include acquiring seismic data of a seismic survey of a region of the Earth that utilizes multiple seismic energy sources and seismic energy receivers where the seismic data include blended seismic data for a number of emissions from a corresponding number of the multiple seismic energy sources; determining spatially distributed coherent noise properties for the region using the blended seismic data; via the spatially distributed coherent noise properties, modeling coherent noise as at least two coherent noise models for at least two of the emissions from a corresponding at least two of the multiple seismic energy sources; via the coherent noise models, attenuating coherent noise in at least a portion of the blended seismic data to generate coherent noise attenuated blended seismic data; deblending the coherent noise attenuated blended seismic data to generate deblended seismic data; and rendering an image of at least a portion of the region to a display using the deblended seismic data. As an example, such a method can include blending the coherent noise models to model cross-talk noise using time delay information for the corresponding emissions. For example, consider performing attenuating that includes performing adaptive subtraction that subtracts the modeled cross-talk noise from a time window of the blended seismic data.

As an example, spatially distributed coherent noise properties can correspond to properties of a near-surface model of a region where image of the region includes a deeper portion of the region. For example, an image can include a shallower region and a deeper region where coherent noise properties can be determined for the shallower region for purposes of improving image quality via modeling and attenuation of coherent noise.

As an example, spatially distributed coherent noise properties can characterize at least one of velocity and attenuation. As an example, spatially distributed coherent noise properties can include at least one visco-elastic property.

As an example, spatially distributed coherent noise properties can include near-surface properties of a region where the near-surface region is defined by a depth or spatially distributed depths. As an example, one or more structural features of the Earth and/or noise features in seismic data may be utilized to determine a depth (or depths) of a near-surface region.

As an example, spatially distributed coherent noise properties can include phase velocities. For example, consider phase velocities that are determined fora plurality of frequencies (see, e.g., the graphic 1550 of FIG. 15).

As an example, a method can include determining spatially distributed coherent noise properties by performing a continuous adaptive surface wave analysis. In such an example, the continuous adaptive surface wave analysis can be based at least in part on unevenly spaced F-K semblances.

As an example, an F-K (or f-k) domain or domains may be utilized where the use of frequency (abbreviated as F or f) and wavenumber (K or k, the reciprocal of wavelength) form a reference framework, for example, as may be obtained by using a Fourier transform over time and space.

As an example, spatially distributed coherent noise properties can correspond to a wave mode or wave modes.

As an example, a seismic survey can be or include a simultaneous source acquisition seismic survey. For example, consider a simultaneous source acquisition survey that includes a marine simultaneous source acquisition seismic survey or that includes a land simultaneous source acquisition seismic survey.

As an example, blended seismic data can include a corresponding time window and, as an example, a method can include estimating a surface wave mode for one of a plurality of emissions from a corresponding one of a plurality of multiple seismic energy sources within the time window.

As an example, a method can include identifying a structural feature in an image. For example, a method can include via coherent noise models, attenuating coherent noise in at least a portion of blended seismic data of a region to generate coherent noise attenuated blended seismic data; deblending the coherent noise attenuated blended seismic data to generate deblended seismic data; and rendering an image of at least a portion of the region to a display using the deblended seismic data. The image or image data can be processed using one or more techniques (e.g., seismic attributes, etc.) to identify one or more structures of the Earth. As an example, an interpretation workflow may include identifying a structural feature in such an image. Where the image has been generated using coherent noise attenuation prior to deblending, the image quality can be enhanced, which, in turn, can improve identification of one or more structural features in the image (e.g., using interpretation, pattern/feature recognition, ant-tracking, edge detection, etc.).

As an example, a system can include a processor; memory operatively coupled to the processor; and processor-executable instructions stored in the memory to instruct the system to: acquire seismic data of a seismic survey of a region of the Earth that utilizes multiple seismic energy sources and seismic energy receivers where the seismic data include blended seismic data for a number of emissions from a corresponding number of the multiple seismic energy sources; determine spatially distributed coherent noise properties for the region using the blended seismic data; via the spatially distributed coherent noise properties, model coherent noise as at least two coherent noise models for at least two of the emissions from a corresponding at least two of the multiple seismic energy sources; via the coherent noise models, attenuate coherent noise in at least a portion of the blended seismic data to generate coherent noise attenuated blended seismic data; deblend the coherent noise attenuated blended seismic data to generate deblended seismic data; and render an image of at least a portion of the region of the Earth to a display using the deblended seismic data. Such a system can include, for example, processor-executable instructions stored in the memory to instruct the system to identify a structural feature in the image (e.g., via pattern/feature recognition, etc.).

As an example, one or more computer-readable storage media can include processor-executable instructions to instruct a computing system to: acquire seismic data of a seismic survey of a region of the Earth that utilizes multiple seismic energy sources and seismic energy receivers where the seismic data include blended seismic data for a number of emissions from a corresponding number of the multiple seismic energy sources; determine spatially distributed coherent noise properties for the region using the blended seismic data; via the spatially distributed coherent noise properties, model coherent noise as at least two coherent noise models for at least two of the emissions from a corresponding at least two of the multiple seismic energy sources; via the coherent noise models, attenuate coherent noise in at least a portion of the blended seismic data to generate coherent noise attenuated blended seismic data; deblend the coherent noise attenuated blended seismic data to generate deblended seismic data; and render an image of at least a portion of the region of the Earth to a display using the deblended seismic data. In such an example, the one or more computer-readable storage media can include processor-executable instructions to instruct a computing system to identify a structural feature in the image (e.g., via pattern/feature recognition, etc.).

As an example, a system may include one or more modules, which may be provided to analyze data, control a process, perform a task, perform a workstep, perform a workflow, etc.

Figure 20:
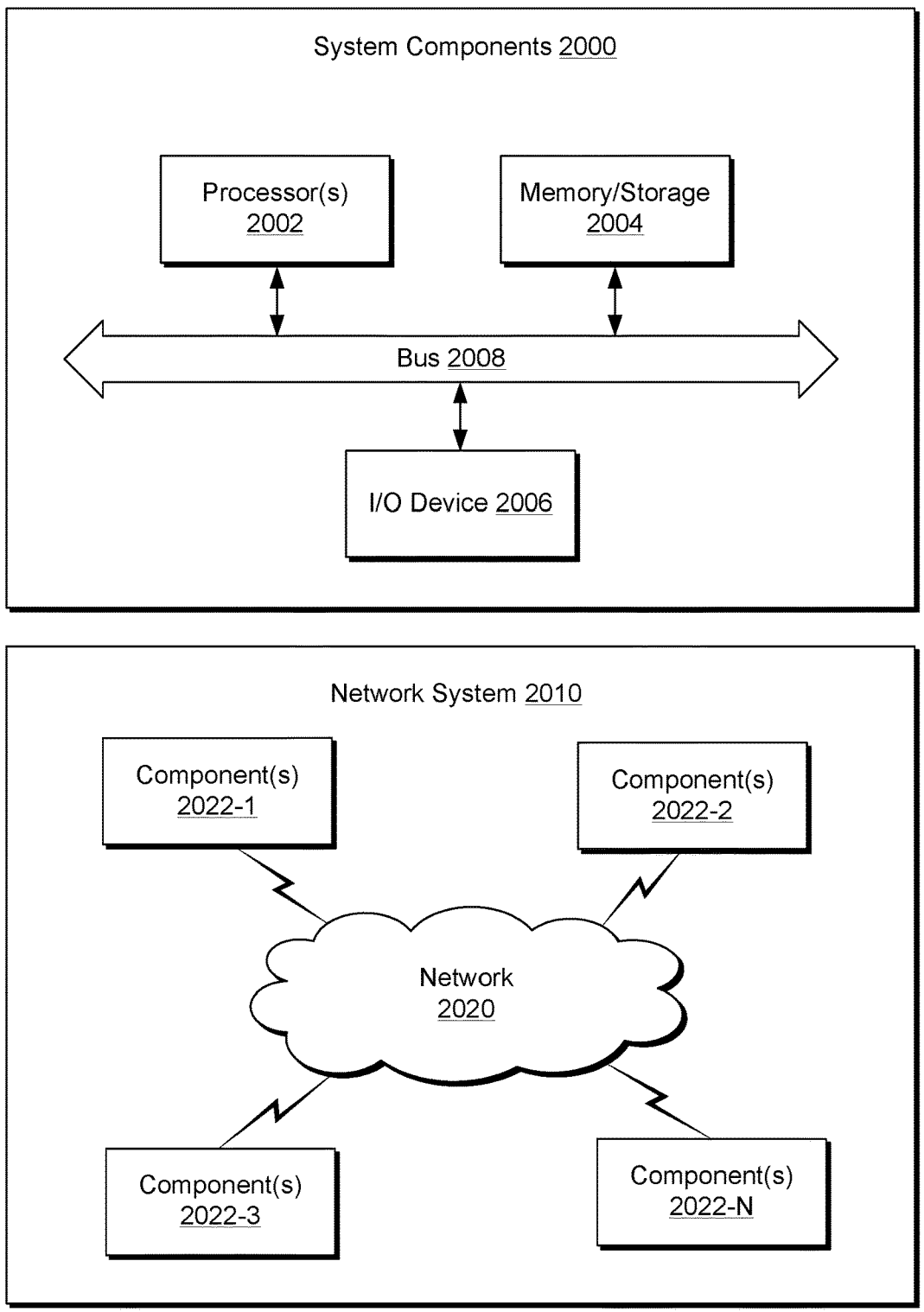
FIG. 20 illustrates example components of a system and a networked system.

FIG. 20 shows components of an example of a computing system 2000 and an example of a networked system 2010. The system 2000 includes one or more processors 2002, memory and/or storage components 2004, one or more input and/or output devices 2006 and a bus 2008. In an example embodiment, instructions may be stored in one or more computer-readable media (e.g., memory/storage components 2004). Such instructions may be read by one or more processors (e.g., the processor(s) 2002) via a communication bus (e.g., the bus 2008), which may be wired or wireless. The one or more processors may execute such instructions to implement (wholly or in part) one or more attributes (e.g., as part of a method). A user may view output from and interact with a process via an I/O device (e.g., the device 2006). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 2010. The network system 2010 includes components 2022-1, 2022-2, 2022-3, . . . 2022-N. For example, the components 2022-1 may include the processor(s) 2002 while the component(s) 2022-3 may include memory accessible by the processor(s) 2002. Further, the component(s) 2002-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH®, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

BIBLIOGRAPHY

The following documents are incorporated by reference herein.

Moore, I., Dragoset, B., Ommundsen, T., Wilson, T., Eke, D., Ward, C., Simultaneous source separation using dithered sources, SEG Technical Program Expanded Abstracts (SEG-2008-2806), 2008 SEG Annual Meeting, 9-14 November, Las Vegas, Nev.

Strobbia, C. L., 2011, Modeling and filtering coherent noise in seismic surveying, U.S. Pat. No. 7,917,295 B2.

Strobbia, C. L., and A., Glushchenko, 2013, Continuous adaptive surface wave analysis for three-dimensional seismic data, U.S. Pat. No. 8,509,027 B2.

Boiero, D., 2016, Modeling and filtering coherent noise in seismic surveys, US Patent Publication No. 20160363681 A1.

Kashubin, A., and Boiero D., 2016, Time lapse seismic data processing, US Patent Application Publication No. 20160320507 A1.

Akerberg, P., Hampson, G., Rickett, J., Martin, H. and Cole, J., 2008, Simultaneous source separation by sparse Radon transform. SEG Technical Program Expanded Abstracts (SEG-2008-2801), 2008 SEG Annual Meeting, 9-14 November, Las Vegas, Nev.

Doulgeris, P., Mandad, A. and Blacquiére, G., 2010, Separation of blended impulsive sources using an iterative approach. 72nd EAGE Conference & Exhibition SPE EUROPEC 2010, Barcelona, Spain, 14-17 Jun. 2010.

Henin, G., Marin, D., Maitra, S., Rollet, A., Chandola, S. K., Kumar, S., El Kady, N. and Cheng Foo L., 2015, Deblending 4-component simultaneous-source data-A 2D OBC case study in Malaysia. SEG Technical Program Expanded Abstracts (SEG-2015-5899893), 2015 SEG Annual Meeting, 18-23 October, New Orleans, La.

Stefani, J., Hampson, G. and Herkenhoff, E., 2007, Acquisition using simultaneous sources. 69th EAGE Conference and Exhibition incorporating SPE EUROPEC 2007 (DOI: 10.3997/2214-4609.201401462).

Shipilova, E., Barone, I., Boelle, G., Giboli, M., Piazza, J., Hugonnet, P. and Dupinet, C., 2016, Simultaneous-source seismic acquisitions: Do they allow reservoir characterization? A feasibility study with blended onshore real data. SEG Technical Program Expanded Abstracts (SEG-2016-13865016), 2016 SEG International Exposition and Annual Meeting, 16-21 October, Dallas, Tex.

Strobbia, C., Vermeer, P., Laake, A., Glushchenko, A. and Re, S., 2010, Surface waves: processing, inversion and removal. First Break, 28, 8, 85-91.

Strobbia, C., Zarkhidze, A., May, R., Quigley, J. and Bilsby, P., 2011, Attenuation of aliased coherent noise: model based attenuation for complex dispersive waves. First Break, 29, 8, 93-100.

What is claimed is:

1. A method comprising:
   acquiring seismic data of a seismic survey of a region of the Earth that utilizes multiple seismic energy sources and seismic energy receivers wherein the seismic data comprise blended seismic data for a number of emissions from a corresponding number of the multiple seismic energy sources;
   determining spatially distributed coherent noise properties for the region using the blended seismic data, wherein the spatially distributed coherent noise properties comprise phase velocities;
   using the spatially distributed coherent noise properties, modeling coherent noise as at least two coherent noise models for at least two of the emissions from a corresponding at least two of the multiple seismic energy sources;
   using the coherent noise models, attenuating coherent noise in at least a portion of the blended seismic data to generate coherent noise attenuated blended seismic data;
   deblending the coherent noise attenuated blended seismic data to generate deblended seismic data; and
   rendering an image of at least a portion of the region to a display using the deblended seismic data.

2. The method of claim 1 comprising blending the coherent noise models to model cross-talk noise using time delay information for the corresponding emissions.

3. The method of claim 2 wherein the attenuating comprises performing adaptive subtraction that subtracts the modeled cross-talk noise from a time window of the blended seismic data.

4. The method of claim 1 wherein the spatially distributed coherent noise properties correspond to properties of a near-surface model of the region wherein the image comprises a deeper portion of the region.

5. The method of claim 1 wherein the spatially distributed coherent noise properties characterize at least one of velocity and attenuation.

6. The method of claim 1 wherein the spatially distributed coherent noise properties comprise at least one visco-elastic property.

7. The method of claim 1 wherein the spatially distributed coherent noise properties comprise near-surface properties of the region wherein the near-surface region is defined by a depth or spatially distributed depths.

8. The method of claim 1 wherein the phase velocities are determined for a plurality of frequencies.

9. The method of claim 1 wherein the determining spatially distributed coherent noise properties comprises performing a continuous adaptive surface wave analysis.

10. The method of claim 9 wherein the continuous adaptive surface wave analysis is based at least in part on unevenly spaced F-K semblances.

11. The method of claim 1 wherein the spatially distributed coherent noise properties correspond to a wave mode.

12. The method of claim 1 wherein the seismic survey comprises a simultaneous source acquisition seismic survey.

13. The method of claim 12 wherein the simultaneous source acquisition survey comprises a marine simultaneous source acquisition seismic survey or a land simultaneous source acquisition seismic survey.

14. The method of claim 1 wherein the blended seismic data comprise a corresponding time window and comprising estimating a surface wave mode for one of the emissions from the corresponding one of the multiple seismic energy sources within the time window.

15. The method of claim 1 comprising identifying a structural feature in the image.

16. A system comprising:
a processor;
memory operatively coupled to the processor; and
processor-executable instructions stored in the memory to instruct the system to:
acquire seismic data of a seismic survey of a region of the Earth that utilizes multiple seismic energy sources and seismic energy receivers wherein the seismic data comprise blended seismic data for a number of emissions from a corresponding number of the multiple seismic energy sources;
determine spatially distributed coherent noise properties for the region using the blended seismic data, wherein the spatially distributed coherent noise properties comprise phase velocities;
using the spatially distributed coherent noise properties, model coherent noise as at least two coherent noise models for at least two of the emissions from a corresponding at least two of the multiple seismic energy sources;
using the coherent noise models, attenuate coherent noise in at least a portion of the blended seismic data to generate coherent noise attenuated blended seismic data;
deblend the coherent noise attenuated blended seismic data to generate deblended seismic data; and
render an image of at least a portion of the region of the Earth to a display using the deblended seismic data.

17. The system of claim 16 comprising processor-executable instructions stored in the memory to instruct the system to identify a structural feature in the image.

18. One or more computer-readable storage media comprising processor-executable instructions to instruct a computing system to:
acquire seismic data of a seismic survey of a region of the Earth that utilizes multiple seismic energy sources and seismic energy receivers wherein the seismic data comprise blended seismic data for a number of emissions from a corresponding number of the multiple seismic energy sources;
determine spatially distributed coherent noise properties for the region using the blended seismic data, wherein the spatially distributed coherent noise properties comprise phase velocities;
using the spatially distributed coherent noise properties, model coherent noise as at least two coherent noise models for at least two of the emissions from a corresponding at least two of the multiple seismic energy sources;
using the coherent noise models, attenuate coherent noise in at least a portion of the blended seismic data to generate coherent noise attenuated blended seismic data;
deblend the coherent noise attenuated blended seismic data to generate deblended seismic data; and
render an image of at least a portion of the region of the Earth to a display using the deblended seismic data.

19. The one or more computer-readable storage media comprising processor-executable instructions to instruct a computing system of claim 18 comprising processor-executable instructions to instruct the computing system to identify a structural feature in the image.

* * * * *